United States Patent
Youn et al.

(10) Patent No.: US 9,112,576 B2
(45) Date of Patent: Aug. 18, 2015

(54) METHOD FOR TRANSMITTING AND RECEIVING SIGNAL IN MULTI-HOP RELAY SYSTEM

(75) Inventors: Ae Ran Youn, Gyeonggi-do (KR); Dong Guk Lim, Gyeonggi-do (KR); Jin Sam Kwak, Gyeonggi-do (KR); Ki Seon Ryu, Gyeonggi-do (KR); Jong Young Han, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 397 days.

(21) Appl. No.: 12/647,325

(22) Filed: Dec. 24, 2009

(65) Prior Publication Data
US 2010/0167770 A1 Jul. 1, 2010

Related U.S. Application Data

(60) Provisional application No. 61/140,892, filed on Dec. 26, 2008.

(51) Int. Cl.
*H04B 7/00* (2006.01)
*H04B 7/155* (2006.01)

(52) U.S. Cl.
CPC ........ *H04B 7/15557* (2013.01); *H04B 7/15521* (2013.01); *H04B 7/15542* (2013.01)

(58) Field of Classification Search
CPC ........... H04B 7/15521; H04B 7/15542; H04B 7/15557; H04B 7/2606; H04L 27/2602; H04L 5/023
See application file for complete search history.

(56) References Cited

U.S. PATENT DOCUMENTS

| | | | |
|---|---|---|---|
| 2008/0070582 A1* | 3/2008 | Cai | 455/450 |
| 2008/0165881 A1* | 7/2008 | Tao et al. | 375/267 |
| 2008/0220790 A1* | 9/2008 | Cai et al. | 455/450 |
| 2008/0227386 A1* | 9/2008 | Dayal et al. | 455/7 |
| 2009/0059838 A1* | 3/2009 | Min et al. | 370/315 |
| 2009/0181615 A1* | 7/2009 | So et al. | 455/7 |
| 2009/0262678 A1* | 10/2009 | Oyman et al. | 370/315 |

\* cited by examiner

*Primary Examiner* — Fanghwa Wang
(74) *Attorney, Agent, or Firm* — Lee, Hong, Degerman, Kang & Waimey

(57) ABSTRACT

A first transparent relay station (RS) can receive a signal from a base station (BS) corresponding to superordinate node of the first transparent RS or a second RS corresponding to superordinate non-transparent RS the first transparent RS through a downlink receive zone, and the first transparent RS can transmit the signal received through the downlink receive zone to a mobile station (MS) through a downlink transmit zone, wherein a downlink subframes of the first transparent RS is located the downlink receive zone and the downlink transmit zone in order.

6 Claims, 23 Drawing Sheets

METHOD FOR TRANSMITTING AND RECEIVING SIGNAL IN MULTI-HOP RELAY SYSTEM

CROSS-REFERENCE TO RELATED APPLICATIONS

Pursuant to 35 U.S.C. §119(e), this application claims the benefit of priority to Provisional Application No. 61/140,892, filed on Dec. 26, 2008, the contents of which are incorporated by reference herein in their entirety.

FIELD OF THE INVENTION

The present invention relates to method for transmitting and receiving signal in multi-hop relay system.

DESCRIPTION OF THE RELATED ART

A relay station (RS) is the technology introduced for eliminating a shade area in a mobile communication system and is widely used. Compared to an old system which is limited to a repeater function of sending a signal by simply amplifying the signal, a current system has evolved into a more intelligent system.

Moreover, a relay station technology is mandatory for a next generation communication system to reduce a cost for an extension of base station installations and a maintenance cost of a backhaul communication network and is also mandatory for a service coverage enlargement and a data processing rate enhancement. In the following, frame structure supporting the relay station in wireless communication system using the relay station.

FIG. 1 depicts a unidirectional relay frame.

Referring to FIG. 1, relay station (RS) may be divided into Odd-hop relay station (RS) and Even-hop relay station (RS) according to the number of hop distance from base station (BS). The Odd-hop RS and even-hop RS can have a hierarchical structure, one network may include at least one of odd-hop RS and at least one of even-hop RS. The frame structure used by BS includes downlink and uplink frame. Downlink frames and uplink frames include Downlink relay zone (DL relay zone) and Uplink relay zone (UL relay zone), respectively.

In downlink relay zone (DL relay zone), a BS can relay data packet to a mobile station (MS) or relay station (RS) and in Uplink relay zone, the MS or RS can relay data packet to the BS.

The frame structure used by an odd-hop RS may include transmit zone and receive zone. For example, downlink zone may include DL transmit zone and DL receive zone. Also, uplink zone may include UL receive zone and UL transmit zone. The Odd-hop RS can relay data packet to the MS or subordinate RS (e.g., even-hop RS) in DL transmit zone. The odd-hop RS can also receive data packet relayed from the subordinate RS (or even-hop RS) in DL receive zone.

The odd-hop RS can relay data packet relayed from the MS or subordinate RS (e.g., even-hop RS) in UL receive zone. The odd-hop RS can also transmit data relayed from the MS or subordinate RS to superordinate RS (or BS) in UL transmit zone.

The frame structure used by the even-hop RS may include transmit zone and receive zone. For example, downlink may be include DL transmit zone and DL receive zone. Uplink may also include UL transmit zone and UL receive zone. In this case, the frame structure used by the even-hop RS is similar to the frame structure used by the odd-hop RS. Superordinate RS of the even-hop RS may be odd-hop RS, subordinate RS of the even-hop RS may be the MS or another odd-hop RS.

FIG. 2 depicts a bi-directional relay frame.

As shown in FIG. 2, it is different from frame structure shown in FIG. 1 that this frame structure has bi-directional transmit zone and bi-directional receive zone.

The frame structure used by an odd-hop RS may include DL access zone, DL bi-directional receive zone, UL access zone and UL bi-directional transmit zone. In this case, gap may be included between the DL access zone and the DL bi-directional receive zone and between the UL access zone and the UL bi-directional transmit zone as guard interval. The frame structure used by an even-hop RS may include DL receive zone, DL bi-directional receive zone, UL access zone and UL bi-directional transmit zone.

Bi-directional transmit zone may be transmit zone of the odd-hop RS or the even-hop RS, RS can transmit data packet relayed from a superordinate RS or a subordinate RS in bi-directional transmit zone. The RS can also receive data packet relayed from the superordinate RS or the subordinate RS in bi-directional receive zone.

In DL access zone, a BS can transmit date packet to MSs, or RS can relay data packet to MSs. Moreover, in UL access zone, MSs can transmit data packet to the BS, or the MSs can transmit data packet to the odd-hop RS or the even-hop RS.

The above frame structure is regardless that whether the odd-hop RS (or the even-hop RS) is transparent RS or non-transparent RS. That is, the above mentioned frame structure does not consider mode of RS (i.e., transparent mode or non-transparent mode). Since RS mode may be divided into transparent RS and non-transparent RS, frame structure considered the mode of RS needs to be configured. However, frame structure according to mode of RS is not proposed yet.

SUMMARY

In one aspect of the present invention, a method for transmitting and receiving signal, at a first transparent relay station (RS), in multi-hop relay system includes receiving a signal from a base station (BS) corresponding to superordinate node of the first transparent RS or a second RS corresponding to superordinate non-transparent RS of the first transparent RS through a downlink receive zone and transmitting the signal received through the downlink receive zone to a mobile station (MS) through a downlink transmit zone, wherein a downlink subframe of the first RS is located the downlink receive zone and the downlink transmit zone in order.

In another aspect of the present invention, a method for transmitting and receiving signal, at a first relay station (RS), in transparent mode in 2-hop relay system includes receiving a signal from a base station (BS) corresponding to superordinate node of the first RS or a second RS through a downlink receive zone and transmitting the signal received through the downlink receive zone to a mobile station (MS) through a downlink access zone, wherein downlink subframes of the first RS is located the downlink receive zone and the downlink access zone in order.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF PREFERRED EMBODIMENTS

Figure 1:
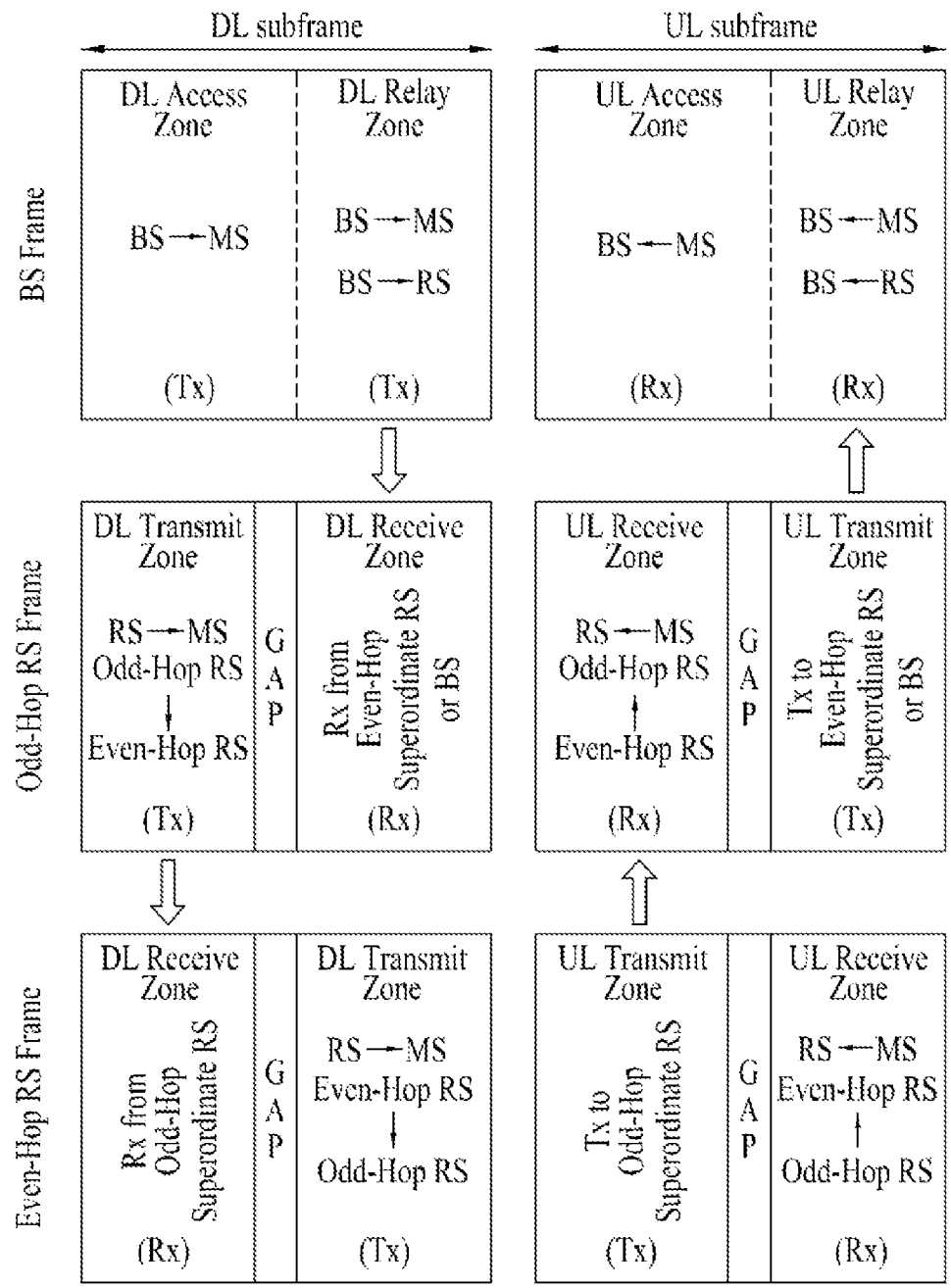
FIG. 1 depicts a unidirectional relay frame.
Figure 2:
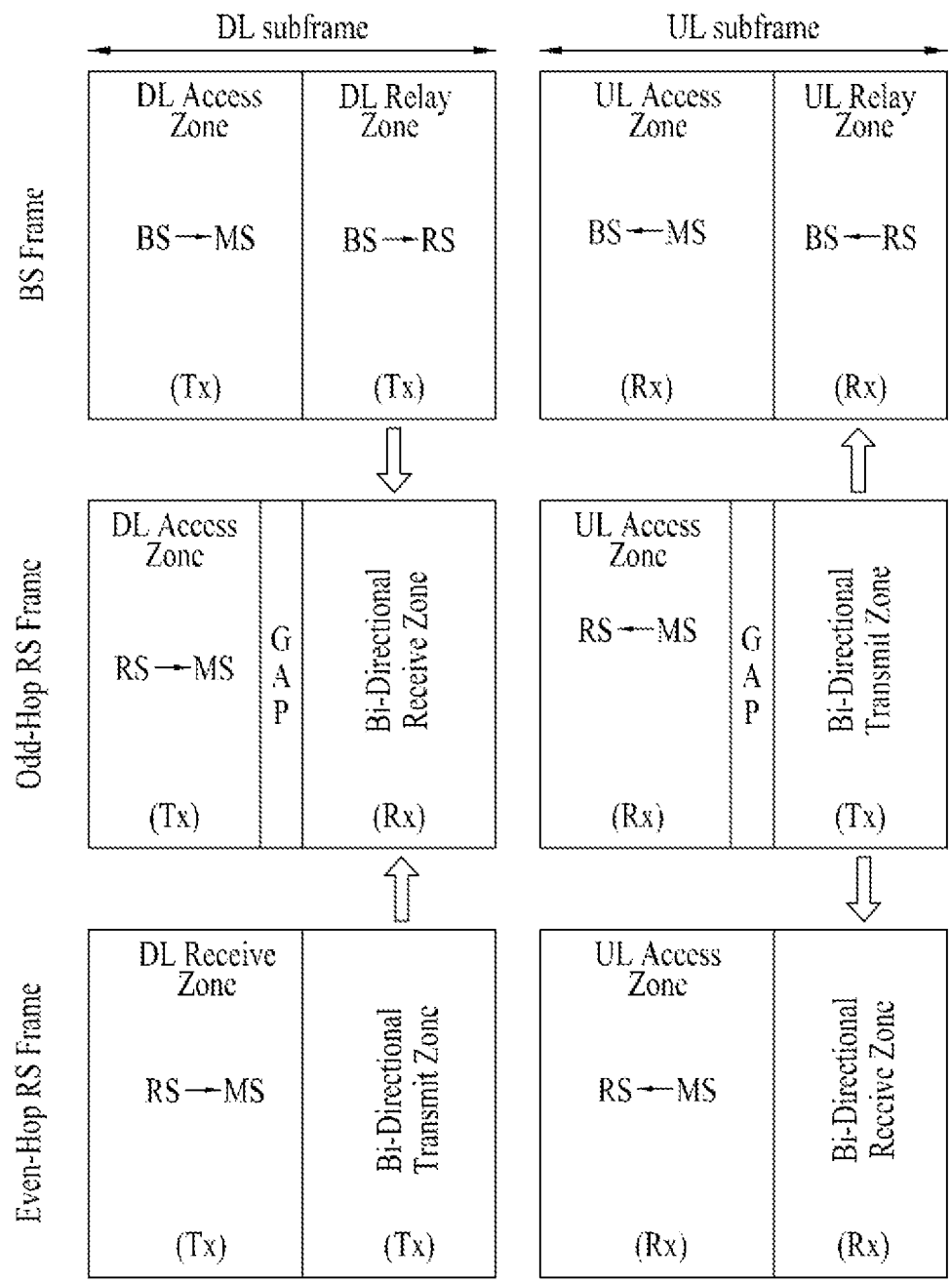
FIG. 2 depicts a bi-directional relay frame.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following description will be given with reference to specific terms, the present invention is not necessarily limited to the specific terms and other terms may also be used to indicate the same meanings. The same reference numbers will be used throughout this specification to refer to the same or like parts.

The expression "a portion includes a specific component" used throughout this specification indicates that the portion may also include other components, rather than includes the specific component alone, unless explicitly stated otherwise.

Technologies described below can be used in a variety of communication systems, which can provide a variety of communication services such as voice and packet data services. Communication system technologies can be used in downlink or uplink. The term "Base Station (BS)" may be replaced with another term such as "fixed station", "Node B", "eNode B (eNB)", "access point", or "ABS". The term "Mobile Station (MS)" may also be replaced with another term such as "User Equipment (UE)", "Subscriber Station (SS)", "Mobile Subscriber Station (MSS)", "AMS", or "mobile terminal".

The term "transmitting end" refers to a node that transmits data or audio services and "receiving end" refers to a node that receives data or audio services. Thus, in uplink, the MS may be a transmitting end and the BS may be a receiving end. Similarly, the MS may be a receiving end and the BS may be a transmitting end in downlink.

A Personal Digital Assistant (PDA), a cellular phone, a Personal Communication Service (PCS) phone, a Global System for Mobile (GSM) phone, a Wideband CDMA (WCDMA) phone, or a Mobile Broadband System (MBS) phone may be used as the MS in the present invention.

The embodiments of the present invention can be supported by standard documents of at least one of the Institute of Electrical and Electronics Engineers (IEEE) 802 system, the 3GPP system, the 3rd Generation Partnership Project Long Term Evolution (3GPP LTE) system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents. Especially, the embodiments of the present invention can be supported by P802.16-2004, P802.16e-2005, P802.16Rev2, and P802.16m AWD or P802.16m draft, which are standard documents of the IEEE 802.16 system.

Specific terms used in the following description are provided for better understanding of the present invention and can be replaced with other terms without departing from the spirit of the present invention.

For example, in the embodiments according to the present invention, the terms of subordinate relay station (RS) and superordinate relay station (RS) will be used in the following description. Subordinate RS and superordinate RS terms are used as relatively concept, a BS may be located at superordinate node of a first RS (e.g., odd-hop RS), the first RS may be located at superordinate node of a second RS (even-hop RS), a third RS may be located at subordinate RS of the second RS.

Frame is data sequence used by physical specification during the fixed time. Orthogonal Frequency Division Multiplexing (OFDM) frame includes downlink frame and uplink frame. In the IEEE 802.16m system, each 20 ms superframe is divided into four equally-sized 5 ms radio frames. And each 5 ms radio frame further consists of seven and six AAI subframes.

Figure 3:
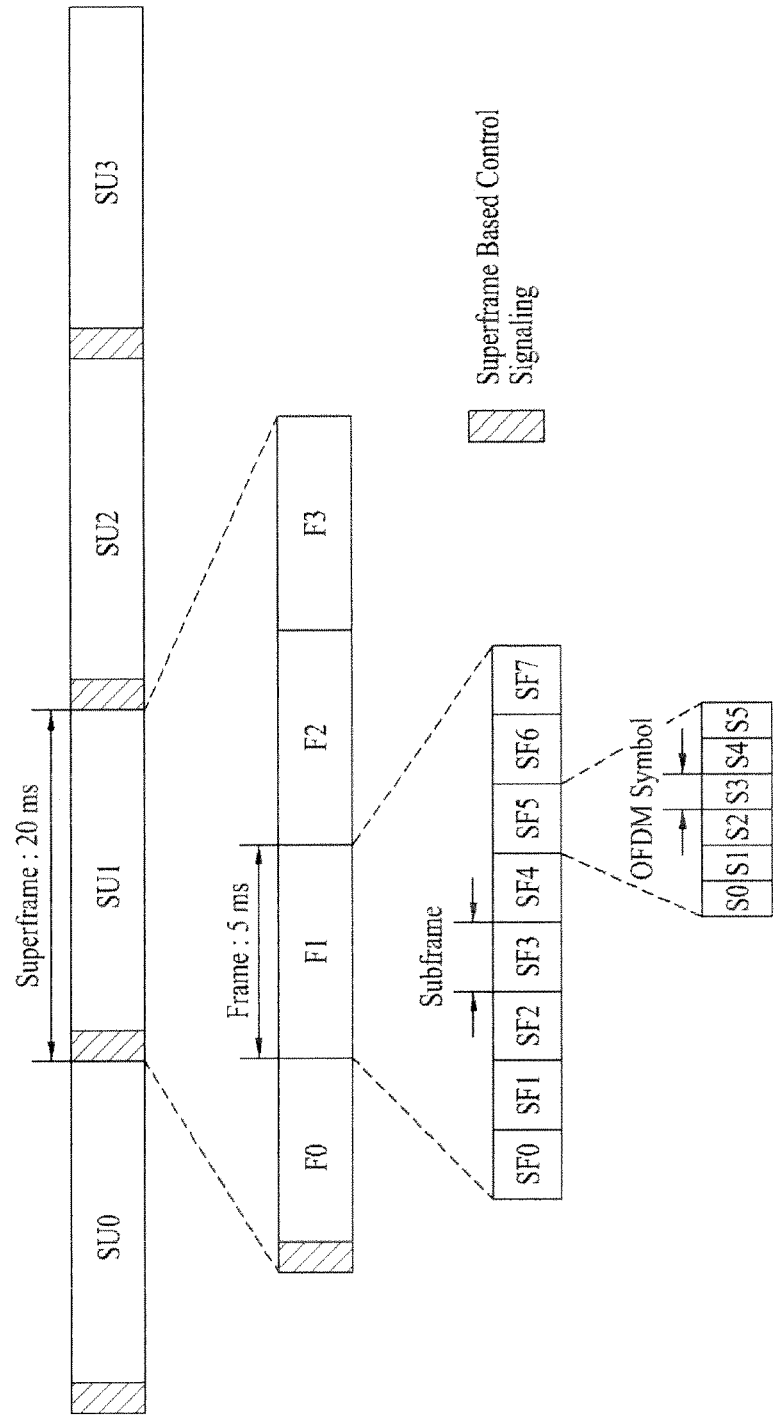
FIG. 3 illustrates an example of frame structure in accordance with the embodiments of the present invention.

FIG. 3 illustrates an example of frame structure in accordance with the embodiments of the present invention.

Referring to FIG. 3, each superframe includes at least one of frame (F0, F1, ..., F3), each frame includes at least one of subframe. Each subframe may also include one or more OFDM symbols. The number and length of superframe, subframe and symbol may be adjusted according to user's requirement, system environments and the like. In the embodiments of the present invention, the term of subframe will be used. Frame is divided into a plurality of 'subframe' having specific length.

In subframe structure according to the embodiments of the present invention, one frame may include one or more subframes. In this case, the number of subframes included in one frame can be determined according to the number of symbols of the subframes. For example, it is assumed that one frame may include 48 symbols. If one subframe may include 6 symbols, one frame may include 8 subframes. Furthermore, one subframe may include 12 symbols, one subframe may include 4 subframes.

As shown in FIG. 3, it is supposed that the length of one superframe and one frame is 20 ms and 5 ms, respectively. That is, one superframe may include 4 frames. Also, one frame has frame structure may include 8 subframes. In this case, one subframe may include 6 OFDMA symbols. Each superframe may include superframe header (SFH). SFH is referred as superframe based control signaling.

Figure 4:
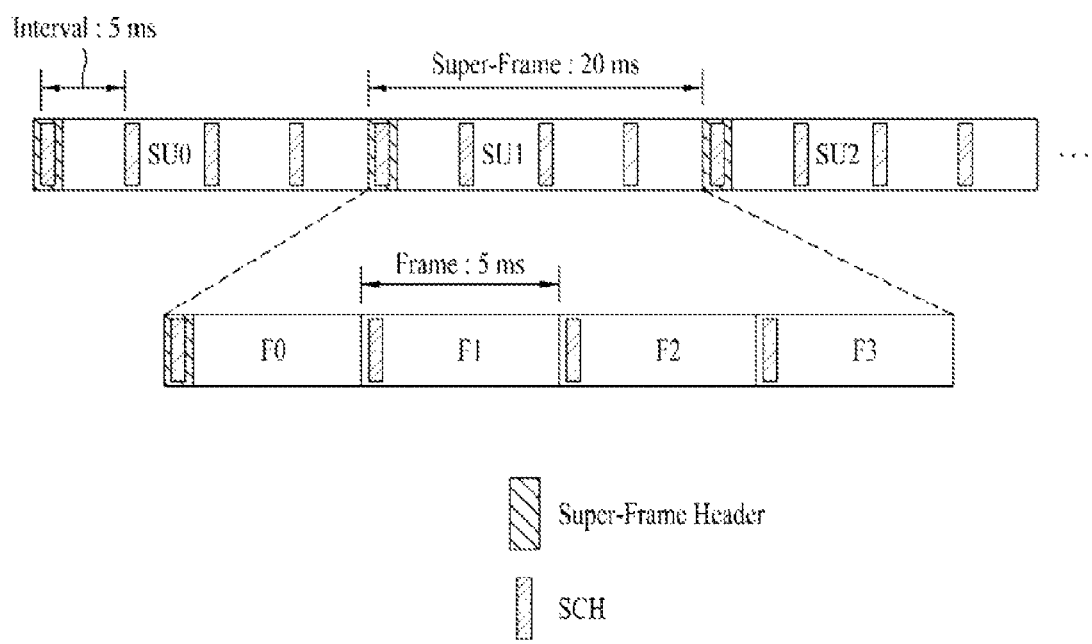
FIG. 4 illustrates an example of transmit location of synchronization channel in accordance with the embodiments of the present invention.

FIG. 4 illustrates an example of transmit location of synchronization channel in accordance with the embodiments of the present invention.

Referring to FIG. 4, one synchronization channel may include at least one of OFDM symbols. A synchronization channel can be transmitted in predefined transmit period (e.g., 5 ms) in the embodiments according to the present invention. The number of OFDM symbols configuring the synchronization channel and transmit period of the synchronization channel can be changed according to the user's requirements and the channel environments.

The followings frame structure can support Time Division Duplex (TDD) scheme in one frame having 5 ms period. Also, Frequency Division Duplex (FDD) can also be applied to the followings frame structures, it is interpreted as operation of TDD/FDD mode. Each zone may be distinguished by subframe unit in frame including one or more subframes and frame unit in superframe including one or more frames.

In embodiments according to the present invention, a preamble may include synchronization channel (SCH) and broadcasting channel (BCH), the preamble can be used as SCH or BCH.

In the IEEE 802.16j system, the operating mode of RS can be divided into two modes. When a RS operates in transparent mode, all MSs within a cell coverage can receive control information (e.g., MAP information) from multi-hop relay base station. In contrast, when the RS operates in non-transparent mode, MS can't receive control information from multi-hop relay base station. In other words, in case of receiving a signal using the transparent RS, the MS can receive a data packet from the transparent RS, but the MS can receive directly the control information from the multi-hop relay base station.

Meanwhile, in case of receiving the signal using the non-transparent RS, the MS can receive data packet and the control information through the non-transparent RS. In order to improve the throughput of cell, the transparent RS generally may be used. And, the non-transparent can be used to improve communication performance.

Hereinafter, frame structure of the transparent RS, the non-transparent RS and frame structure for coexistence of the transparent RS and the non-transparent will be described. Moreover, control signal required for the frame structure will be described in the following description.

A BS can transmit indication information indicating corresponding RS is either transparent mode or non-transparent mode in followings cases. For example, 1) if the corresponding RS enters into initial network, 2) if mode of the corresponding RS is changed between transparent and non-transparent, 3) mode of the corresponding RS is not determined.

A RS which enters into initial network can establish RS mode in setup process of subscriber station basic capability (SBC) including capability of the RS. In other words, mode of the RS can be expressed in 2 bit in SBC-RSP message. For instance, '00' indicates transparent mode, '10' indicates non-transparent mode, '11' transparent mode, non-transparent mode and coexistence mode may be expressed in 1 bit.

Moreover, when mode of RS is changed between transparent mode and non-transparent mode, a BS can transmit indication about changed mode and change timing point to be changed RS. For example, if the mode of RS is '0', the BS notifies transparent mode to the RS and if the mode of RS is '1', the BS notifies non-transparent mode to the RS through MAC message.

In this case, the BS can transmit mode indication information using unicast or multicast. The BS can transmit a transmit timing point that is expressed in the number of frame and subframe, the number of frame, the number of subframe, time offset, and the like to the RS. The BS can broadcast information including allocation information and starting point of each zone in the BS and RS according to the mode (e.g., transparent mode, non-transparent mode, and coexistence mode).

Table 1 illustrates an example of mode allocation information of RS.

TABLE 1

| Bit size | Mode |
| --- | --- |
| 1 bit | '0' indicates transparent mode |
|  | '1' indicates non-transparent mode |
| 2 bit | '00' indicates transparent mode |
|  | '01' indicates non-transparent mode |
|  | '10' indicates coexistence mode |

Referring to table 1, in case of coexistence mode, more specially, if RS is nontransparent mode and superordinate RS of the RS is transparent mode, the mode indication may be expressed as '10'. If RS is transparent mode and superordinate RS of the RS is non-transparent mode, the mode indication may be expressed as '11'.

Zone allocation information of uplink and downlink of a BS can be expressed in 3 bit, respectively. For instance, it is supposed that downlink subframes of the BS is allocated 16m DL transmit zone, 16m DL access zone in order. Zone allocation information '011' of the BS may mean that 16m DL access zone begin from a fourth subframe. In contrast, zone allocation information '111' of the BS may mean that 16m DL receive zone begin from a eighth subframe.

Furthermore, it is assumed that downlink subframes of a BS is allocated 16m down access zone, 16m downlink transmit zone in order. Zone allocation information '011' of the BS may mean that 16m DL transmit zone begin from a fourth subframe, in contrast, zone allocation information '111' of the BS may mean that 16m DL receive zone begin from a eighth subframe. As above described, 16m DL transmit zone is called as 16m DL relay zone and 16m UL receive zone is also called as 16m UL relay zone.

Zone allocation information of uplink and downlink of an odd/even-hop RS can be expressed in 3 bit, respectively. In similar to this, for example, it is supposed that downlink subframes of RS is allocated 16m DL receive zone, 16m DL transmit zone in order. If so, zone allocation information '011' of the BS may mean that 16m DL transmit zone begin from a fourth subframe, in contrast, if zone allocation information of the BS is '111' may mean that 16m UL receive zone can begin from a eighth subframe.

Moreover, for example, when downlink subframes of the RS is allocated 16m DL transmit zone, 16m DL receive zone in order, if zone allocation information '011' of the RS may mean that 16m DL receive zone begin from the fourth subframe, in contrast, if zone allocation information of the RS is '111' may mean that 16m UL transmit zone can begin from the eighth subframe.

Since the zone allocation of even-hop RS is equal to location that 16m DL transmit zone and 16m DL receive zone of odd-hop RS is switched, it is sufficient that although either zone allocation information of odd-hop RS or zone allocation information of even-hop RS is present.

A BS or superordinate RS can transmit hop information of subordinate RS having 1 bit size using a superframe header, a control channel except for the superframe header, or the like. (i.e., size of hop information is 1 bit). In this case, '0' may indicate even-hop and '1' may indicate odd-hop. A RS can transmit hop-information of the RS (1 bit: '0' even-hop, '1' odd-hop) to a MS or subordinate RS.

Location of 16m DL access zone of non-transparent RS may be appointed or omitted and zone allocation information of the BS may be omitted.

A BS can transmit ID set information and synchronization channel (SCH) offset information of a transparent RS to a MS. This information can be transmitted through superframe header (SFH), broadcast channel (BCH), or another control channel for transmitting control information. The SFH or the BCH is channel for transmitting timing information of system, bandwidth information used by the system, the number of transmit antenna of the BS, and the like to the MS within a cell. The BCH is located at the same frame with SCH or can be transmitted in SFH unit.

In embodiments according to the present invention, a RS may be divided into odd-hop RS and even-hop RS according to hop distance of from a BS. The odd-hop RS and the even-hop RS can have a hierarchical structure, one network may include at least one of odd-hop RS and at least one of even-hop RS.

Figure 5:
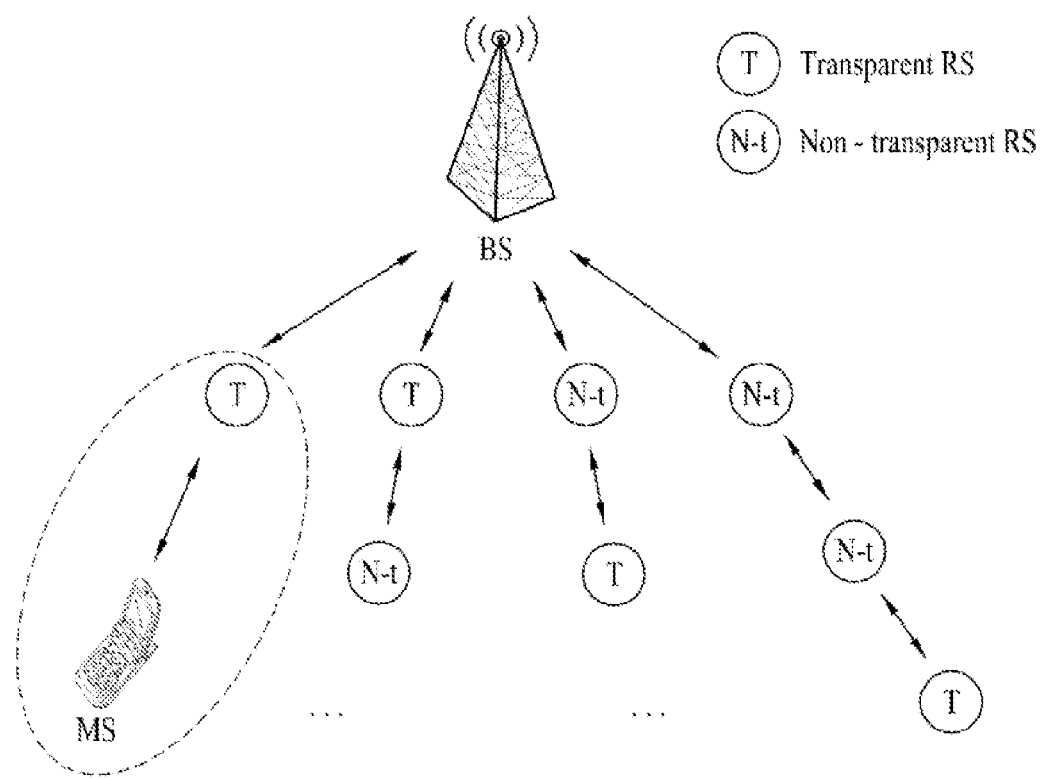
FIG. 5 illustrates an example of coexistence structure of transparent RS and non-transparent RS.
Figure 6:
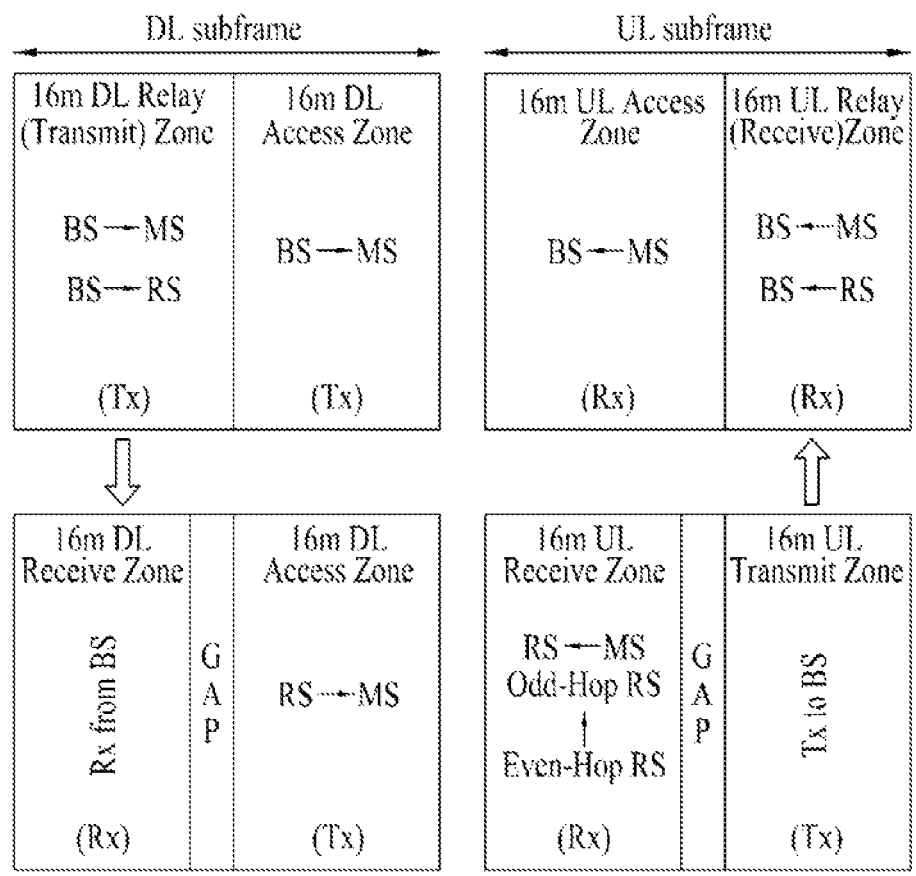
FIG. 6 illustrates an example of frame structure for communicating through transparent RS in 2-hop relay system.

FIG. 5 illustrates an example of coexistence structure of transparent RS and non-transparent RS, FIG. 6 illustrates an example of frame structure for communicating through transparent RS in 2-hop relay system.

Referring to FIG. 6, a MS can communicate with a BS via a transparent RS, the MS can receive mode of corresponding RS from the BS and can establish a connection. In other words, a MS served from the transparent RS need to receive directly downlink control information such as preamble, superframe header (SFH), Advanced MAP (A-MAP), and the like.

Downlink subframes of the transparent RS can be allocated 16m DL receive zone, 16m DL access zone in order, downlink subframes of the BS can be allocated 16m DL transmit zone, 16m DL access zone in order. Uplink subframes of the transparent RS can be allocated 16m UL receive zone, 16m UL transmit zone in order, uplink subframes of the BS can be allocated 16m UL access zone, 16m UL transmit zone in order.

A MS can obtain synchronization from transmit zone among downlink subframes of a BS. In the downlink subframes of the BS, the BS can transmit data to the MS and a RS using 16m DL transmit zone, the BS can transmit directly data to the MS using 16m DL access zone.

In downlink subframes of the transparent RS, the transparent RS can receive signal from a BS through 16m DL receive zone, odd-hop transparent RS can transmit directly signal to a MS through 16m DL access zone.

In uplink subframes of the transparent RS, the transparent RS can receive data from the MS through 16m uplink receive zone, the transparent RS can transmit data to the BS through 16m UL transmit zone.

In uplink subframes of the BS, the BS can receive data from the MS through 16m UL access zone, the BS can receive data from the MS and subordinate transparent RS.

Figure 7:
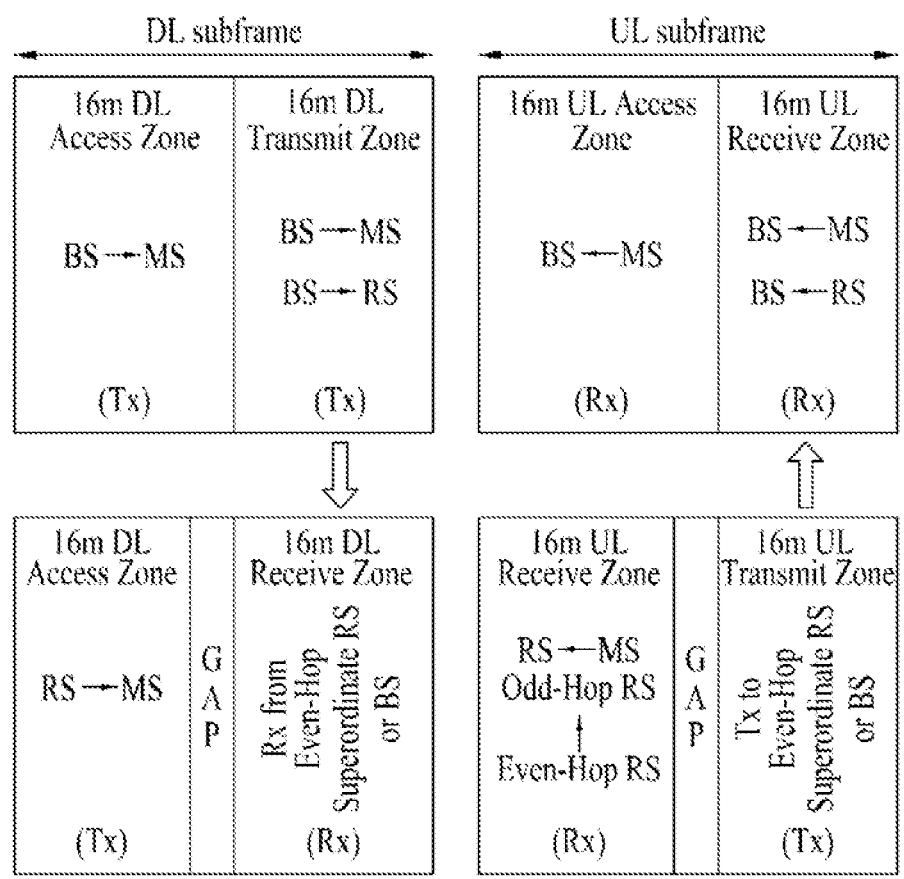
FIG. 7 illustrates an example of frame structure in case of communicating through a transparent RS.

FIG. 7 illustrates an example of frame structure in case of communicating through a transparent RS.

Comparing to FIG. 6, it is different that downlink subframes of the transparent RS may be allocated 16m DL access zone and 16m DL receive zone in order, uplink subframes of the transparent RS may be allocated 16m UL receive zone and 16m UL transmit zone in order. Downlink subframes of the BS may be allocated 16m DL access zone and 16m DL transmit zone in order, uplink subframes of the BS may be allocated 16m UL access zone and 16m UL receive zone in order.

The BS can transmit synchronization channel through 16m downlink transmit zone so that the MS and the transparent RS can synchronize with the BS. Furthermore, preferably, the BS transmit MAP information (or user specific control channel (USCCH)) to a MS that have determined RS or relay. The MS receive data from the BS through 16m downlink access zone of the BS and receive simultaneously from the transparent RS through 16m DL transmit zone of the transparent RS so that the MS have advantages to obtain diversity gain.

Figure 8:
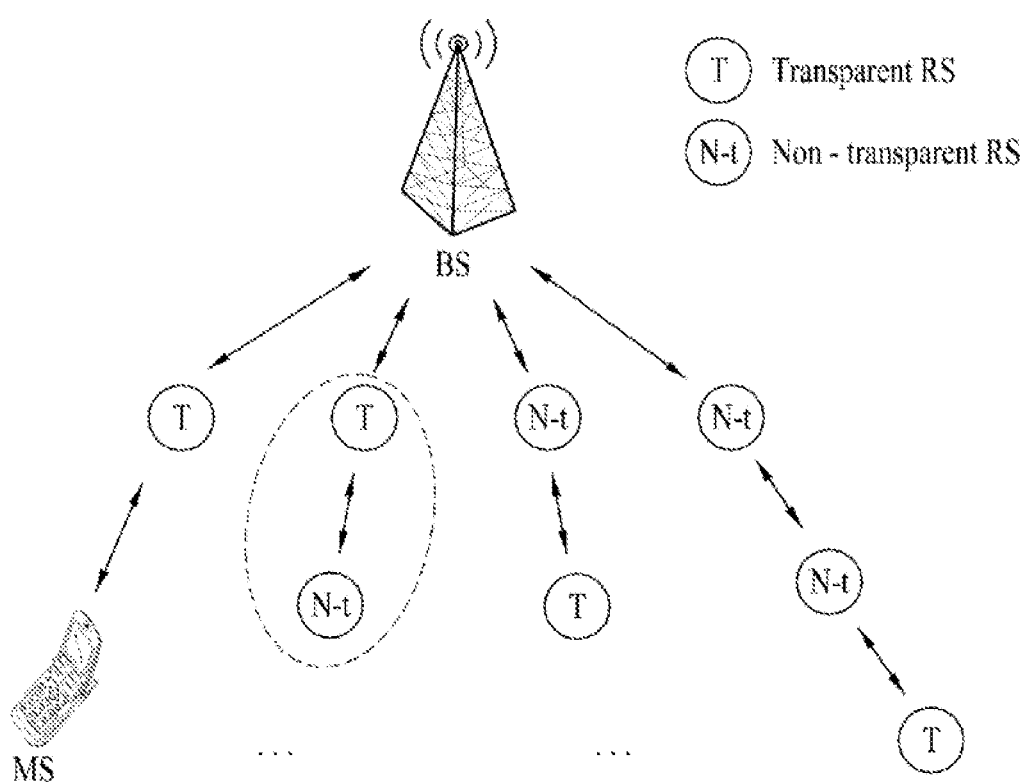
FIG. 8 illustrates coexistence structure of transparent RS and non-transparent RS.
Figure 9:
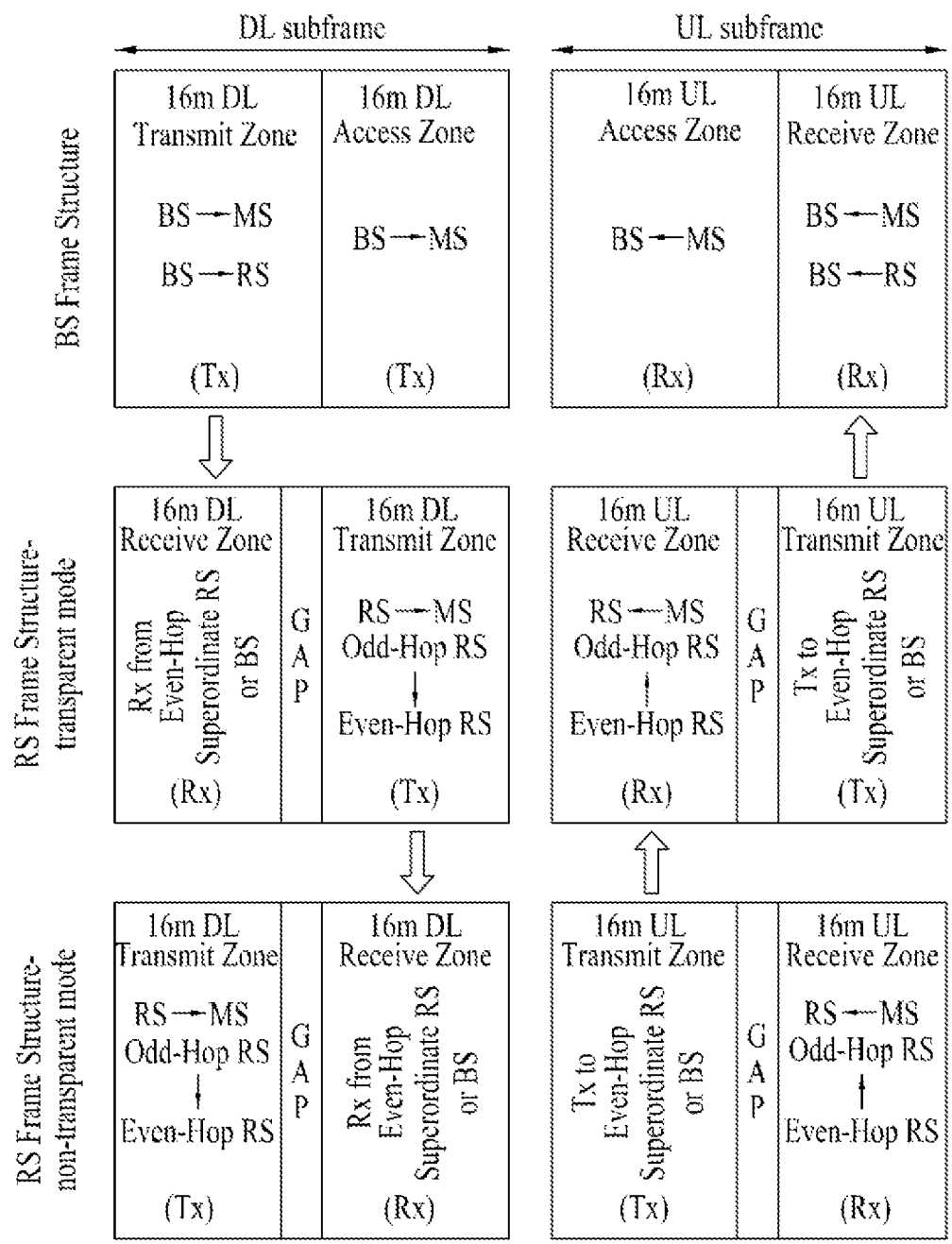
FIG. 9 illustrates an example of frame structure that transparent RS and non-transparent RS coexist.

FIG. 8 illustrates coexistence structure of transparent RS and non-transparent RS, FIG. 9 illustrates an example of frame structure that transparent RS and non-transparent RS coexist.

Referring to FIG. 9, a BS is connected to transparent RS. FIG. 9 shows frame structures that the transparent RS is connected to subordinate non-transparent RS. If subordinate RS of the transparent RS is set to non-transparent RS, the BS can transmit RS mode '10' to the non-transparent RS as above described table 1. The non-transparent RS which is set to coexistence mode can transmit this information to subordinate MS.

In this case, the information may be transmitted to the subordinate MS through SFH transmitted by the non-transparent RS, BCH, or another control channel. The information includes mode information of RS, zone allocation information for each mode, and zone location information. Alternatively, the information includes zone allocation information of mode of corresponding RS and zone location information. Zone location information and zone allocation information of a BS may be omitted.

The MS can receive data through 16m DL transmit zone and 16m DL access zone among the downlink subframes of the BS, but since strength of signal is weak and the MS cannot receive the data. Thus, the MS receive a preamble through the 16m DL transmit zone and then synchronize with non-transparent RS and then receive data from the non-transparent RS.

Odd-hop (1-hop) transparent RS connected to the BS has frame structure the transparent RS as shown in FIG. 5. Even-hop (2-hop) transparent RS has frame structure of non-transparent RS as shown in FIG. 1 and downlink subframes of even-hop (2-hop) transparent RS may be allocated 16m DL transmit zone and 16m DL receive zone in order.

Therefore, in subordinate-hop of 2-hop, downlink subframes of odd-hop RS (e.g., 3-hop) may be allocated 16m DL receive zone and 16m DL transmit zone in order, zone allocation order of downlink subframes of even-hop RS is equal to that of 2-hop RS. Uplink subframes of odd-hop RS may be allocated 16m UL receive zone and 16m UL transmit zone in order, uplink subframes of odd-hop RS may be allocated 16m UL transmit zone and 16m UL receive zone in order.

Figure 10:
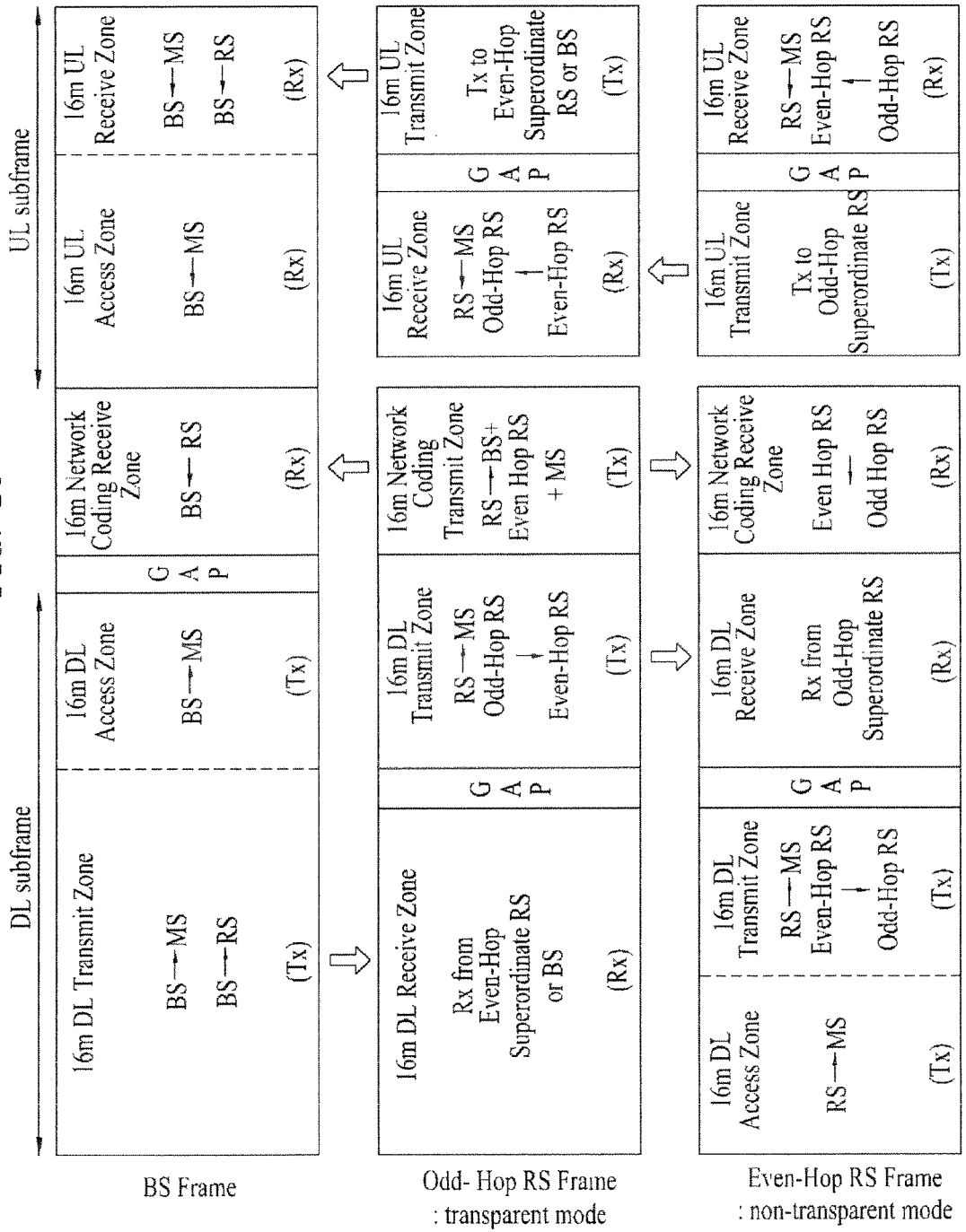
FIG. 10 illustrates an example of frame structure that transparent RS and non-transparent RS coexist.

FIG. 10 illustrates an example of frame structure that transparent RS and non-transparent RS coexist.

Referring to FIG. 10, 16m network coding zone is extended zone from the frame structure shown in FIG. 9 for bi-directional transmitting and receiving. The 16m network coding zone (or bi-directional zone) may be allocated in a third zone of a BS and a RS. Also, in downlink subframes of even-hop non-transparent RS, 16m DL transmit zone may be divided into 16m DL access zone and 16m DL transmit zone. In this case, the 16m DL access zone is zone for a MS and a RS which are served by even-hop RS and try to enter into initial network, the 16m DL transmit zone is zone for transmitting data to subordinate MS or subordinate RS. The 16m network coding zone (or bi-directional zone) may be operated selectively.

Figure 11:
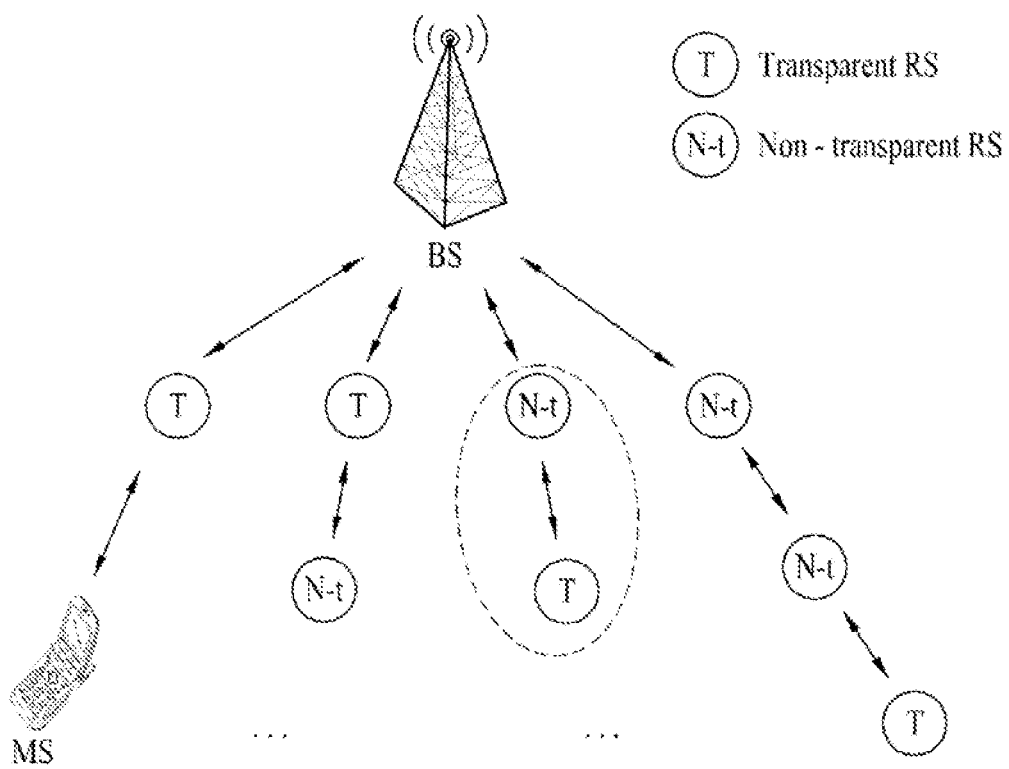
FIG. 11 illustrates coexistence structure of transparent RS and non-transparent RS.
Figure 12:
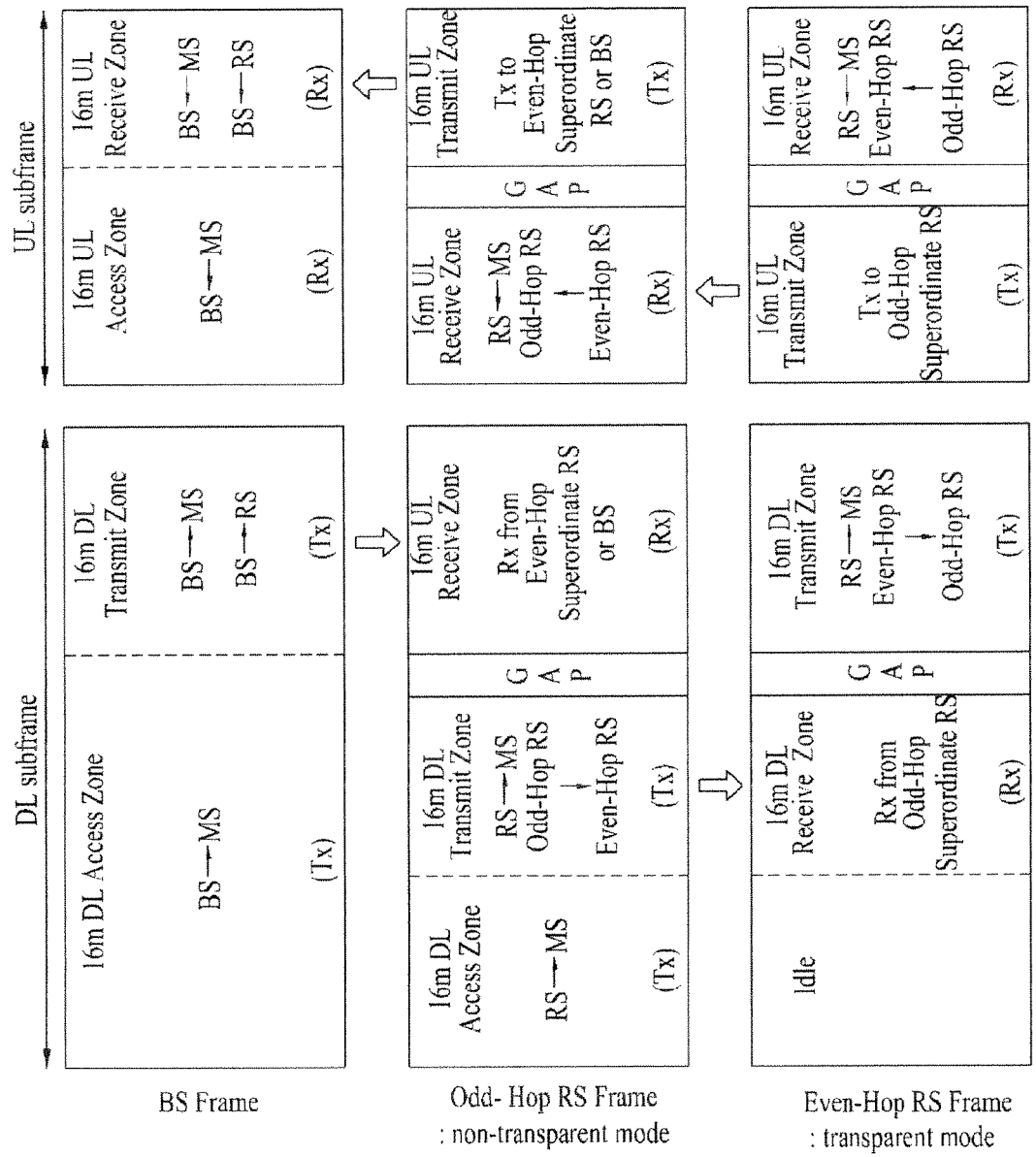
FIG. 12 illustrates an example of frame structure that transparent RS and non-transparent RS coexist.

FIG. 11 illustrates coexistence structure of transparent RS and non-transparent RS, FIG. 12 illustrates an example of frame structure that transparent RS and non-transparent RS coexist.

Referring to FIG. 12, a BS is connected to non-transparent RS, the non-transparent RS is connected to subordinate transparent RS. If subordinate RS of the non-transparent RS is set to transparent RS, the BS can transmit RS mode '11' to the transparent RS as described above table 1.

If a MS uses the transparent RS, the MS can receive directly control signal (e.g., A-preamble (SCH), BCH, MAP information, or the like) from the BS. That is, the BS can control RS and can then transmit control signals to the MS. When the MS is located at cell boundary or out of cell coverage, the MS uses the non-transparent RS. In this case, the non-transparent RS can transmit control signals, A-MAP information and the like. As frame structure shown in FIG. 12, the MS can receive preamble, MAP, control signals and the like through a 16m DL access zone among downlink subframes of an odd-hop non-transparent RS. That is, in this case, the MS synchronize with the odd-hop non-transparent RS and then receive data.

Frame structure used by the BS is followings. Downlink subframes of the BS may be allocated 16m DL access zone and 16m DL transmit zone, uplink subframes of the BS may be allocated 16m UL access zone and 16m UL receive zone.

Frame structure used by an even-hop RS is followings. Downlink subframes may be allocated idle zone, 16m DL receive zone, and 16m DL transmit zone in order, uplink subframes may be allocated 16m UL transmit zone and 16m UL receive zone in order.

Moreover, frame structure used by odd-hop non-transparent RS corresponding to even-hop transparent RS is followings. Downlink subframes of the odd-hop RS may be allocated 16m DL access zone, 16m DL transmit zone, and 16m DL receive zone in order, uplink subframes of the odd-hop RS may be allocated, 16m UL receive zone and 16m UL transmit zone in order. In downlink subframes of subordinate odd-hop non-transparent RS of the even-hop transparent RS, a first subframe may be allocated as 16m DL transmit zone so that the MSs which is served by the transparent RS can receive downlink control signal from the BS.

Figure 13:
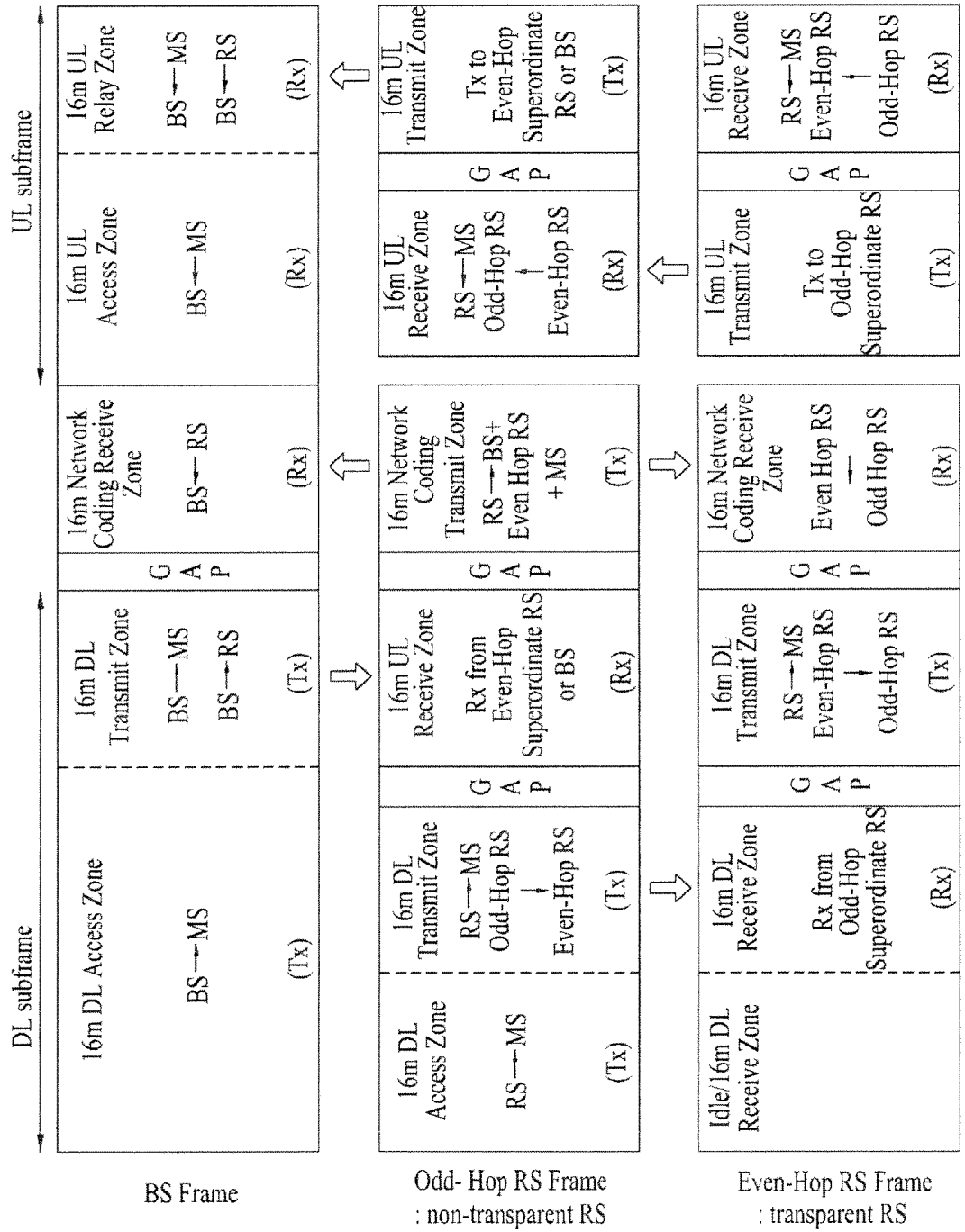
FIG. 13 to FIG. 15 illustrates an example of frame structure that transparent RS and non-transparent RS coexist, respectively.
Figure 14:
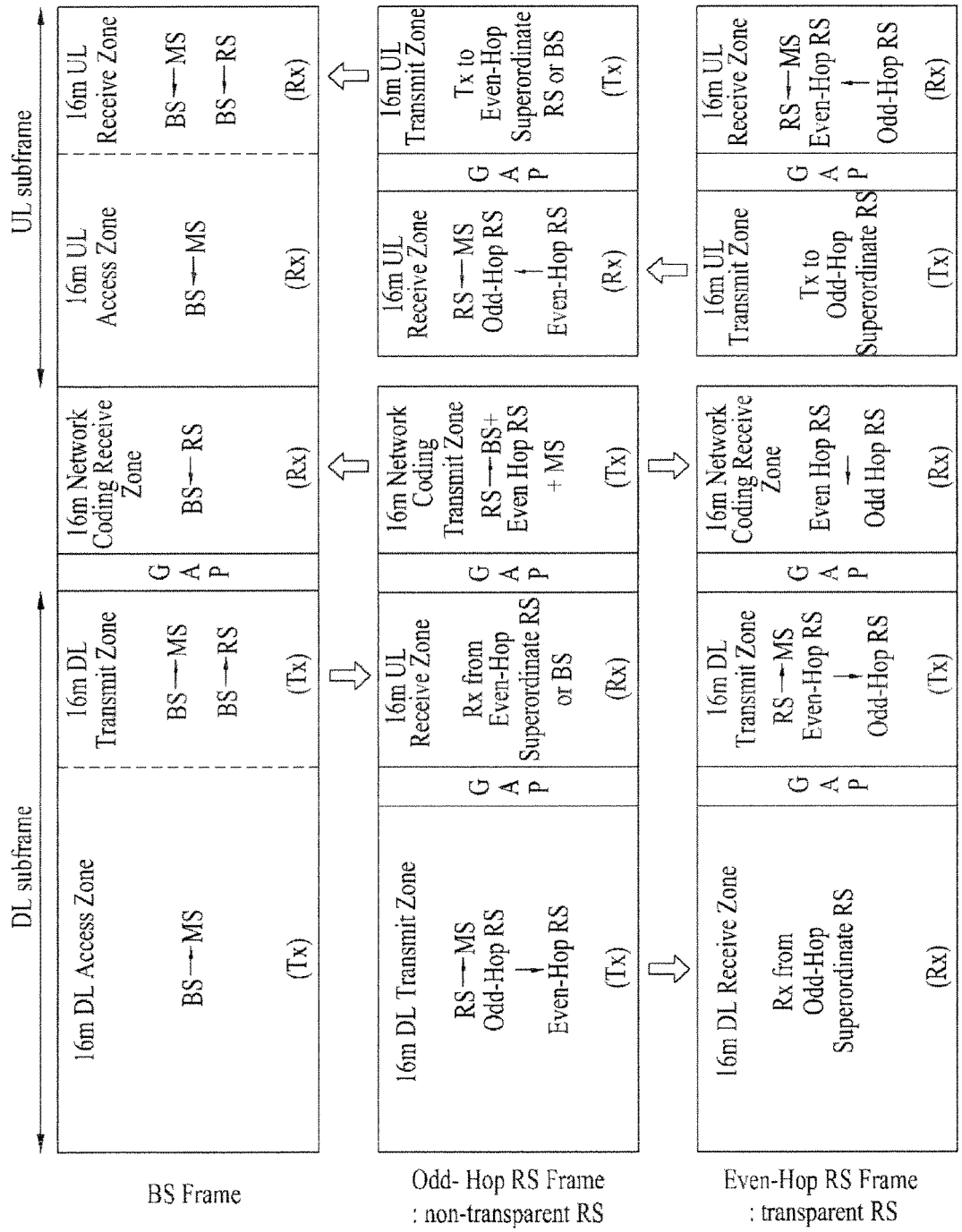
Figure 15:
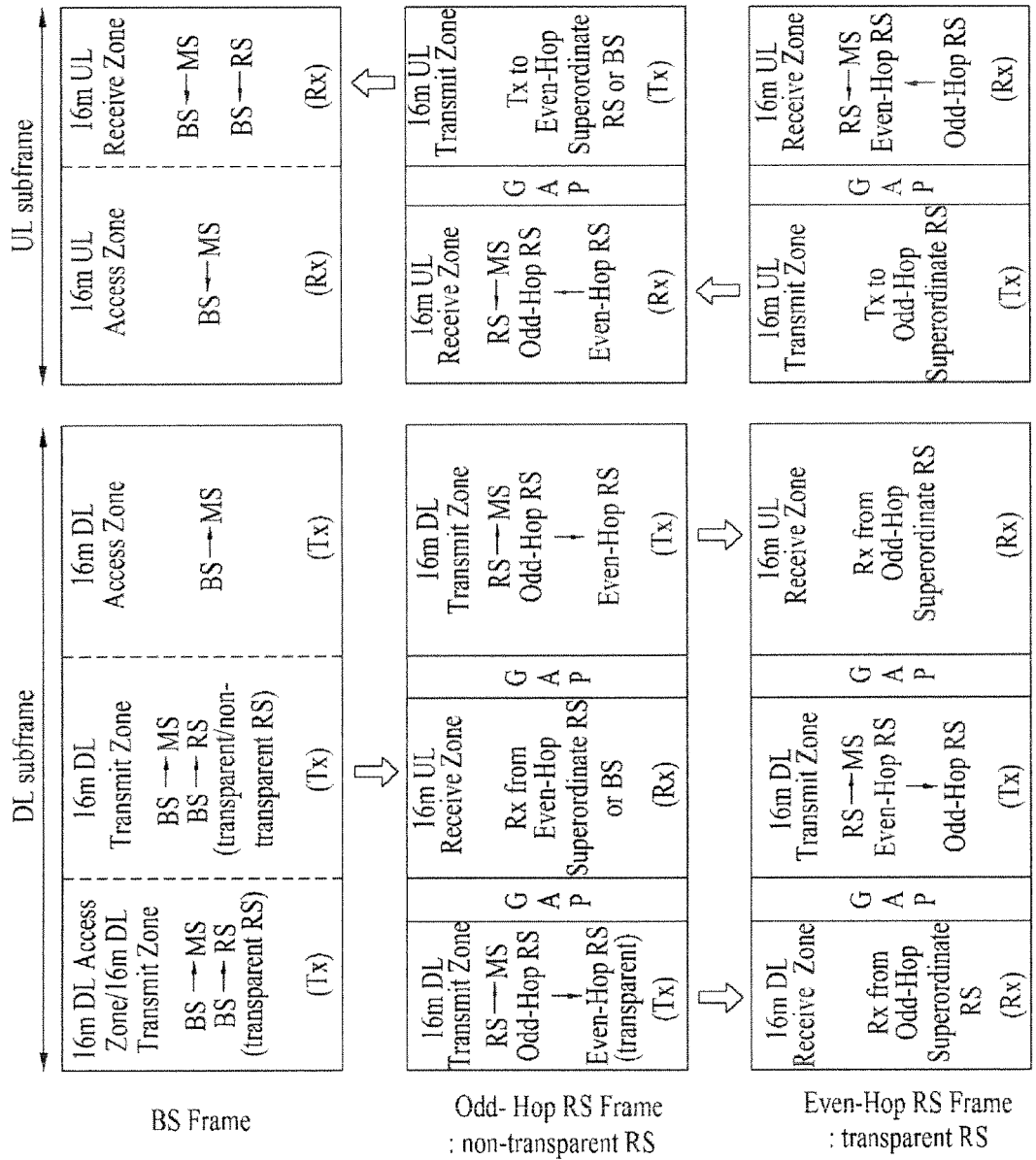

FIG. 13 to FIG. 15 illustrates an example of frame structure that transparent RS and non-transparent RS coexist, respectively.

Comparing to the frame structure shown in FIG. 12, frame structure shown in FIG. 13 further includes additional zone structure (i.e., the 16m network coding zone). In frame structure of an odd-hop non-transparent RS, the 16m network coding transmit zone that can simultaneously transmit data to a BS, a subordinate RS, and a subordinate MS may be additionally allocated. Also, in frame structure of the BS, the 16m network coding receive zone that can receive data from the subordinate RS may be additionally allocated, in frame structure of an even-hop transparent RS, the 16m network coding receive zone that can receive data from a superordinate odd-hop RS may be additionally allocated.

Referring to FIG. 14, as shown in FIGS. 12 and 13, the BS is connected to a non-transparent RS, the non-transparent RS is connected to a subordinate transparent RS. Comparing to FIG. 13, one 16m DL transmit zone may be allocated instead of 16m DL access zone and 16m DL transmit zone in downlink subframes of the odd-hop transparent RS. Also, one 16m DL receive zone may be allocated instead of idle zone and 16m DL receive zone in downlink subframes of the even-hop transparent RS.

Referring to FIG. 15, downlink subframes of an even-hop transparent RS may be allocated 16m DL receive zone, 16m DL transmit zone, and 16m DL receive zone in order, uplink subframes of the even-hop transparent RS may be allocated 16m UL transmit zone and 16m UL receive zone in order.

Downlink subframes of a superordinate odd-hop transparent RS may be allocated 16m DL transmit zone, 16m DL receive zone, and 16m DL transmit zone in order, uplink subframes of a superordinate odd-hop transparent RS may be allocated 16m UL receive zone and 16m UL transmit zone in order.

Downlink subframes of a BS may be allocated 16m DL access zone, 16m DL transmit zone, and 16m DL access zone in order, uplink subframes of the BS may be allocated 16m UL access zone and 16m UL receive zone. A 16m network coding zone may be additionally allocated subframe subsequent to the 16m DL transmit zone in the odd-hop, and the 16m network coding zone may be additionally allocated subframe subsequent to the 16m DL receive zone in the even-hop.

Figure 16:
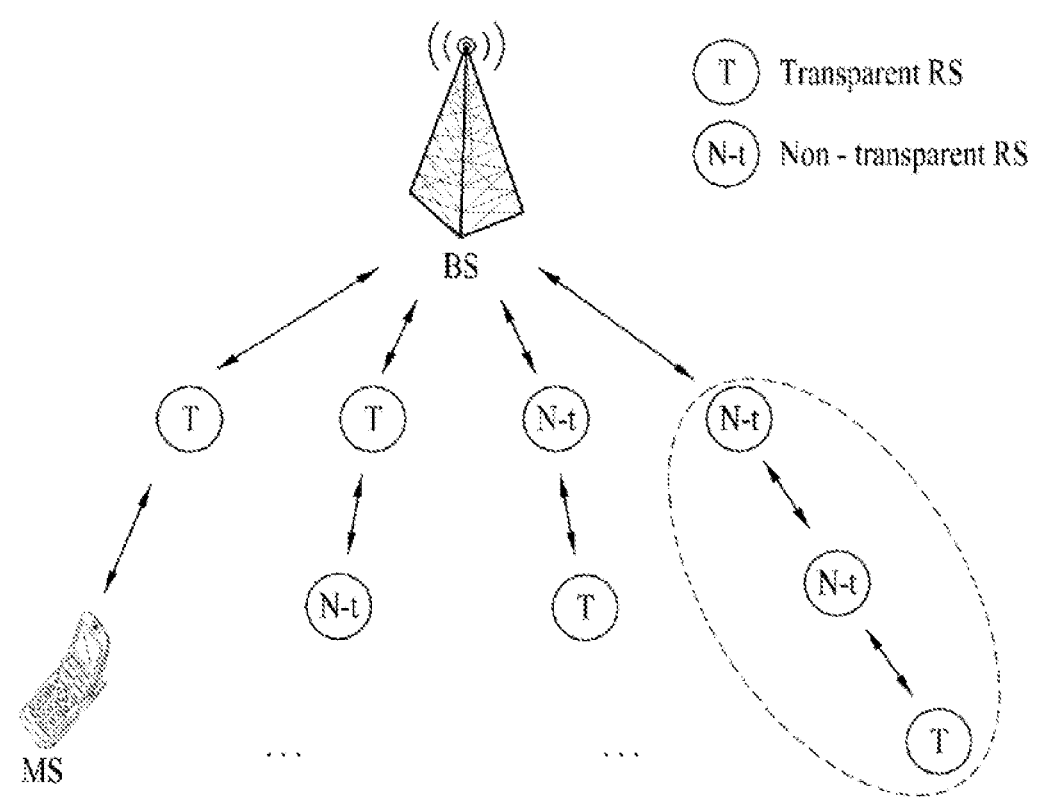
FIG. 16 illustrates coexistence structure of transparent RS and non-transparent RS.
Figure 17:
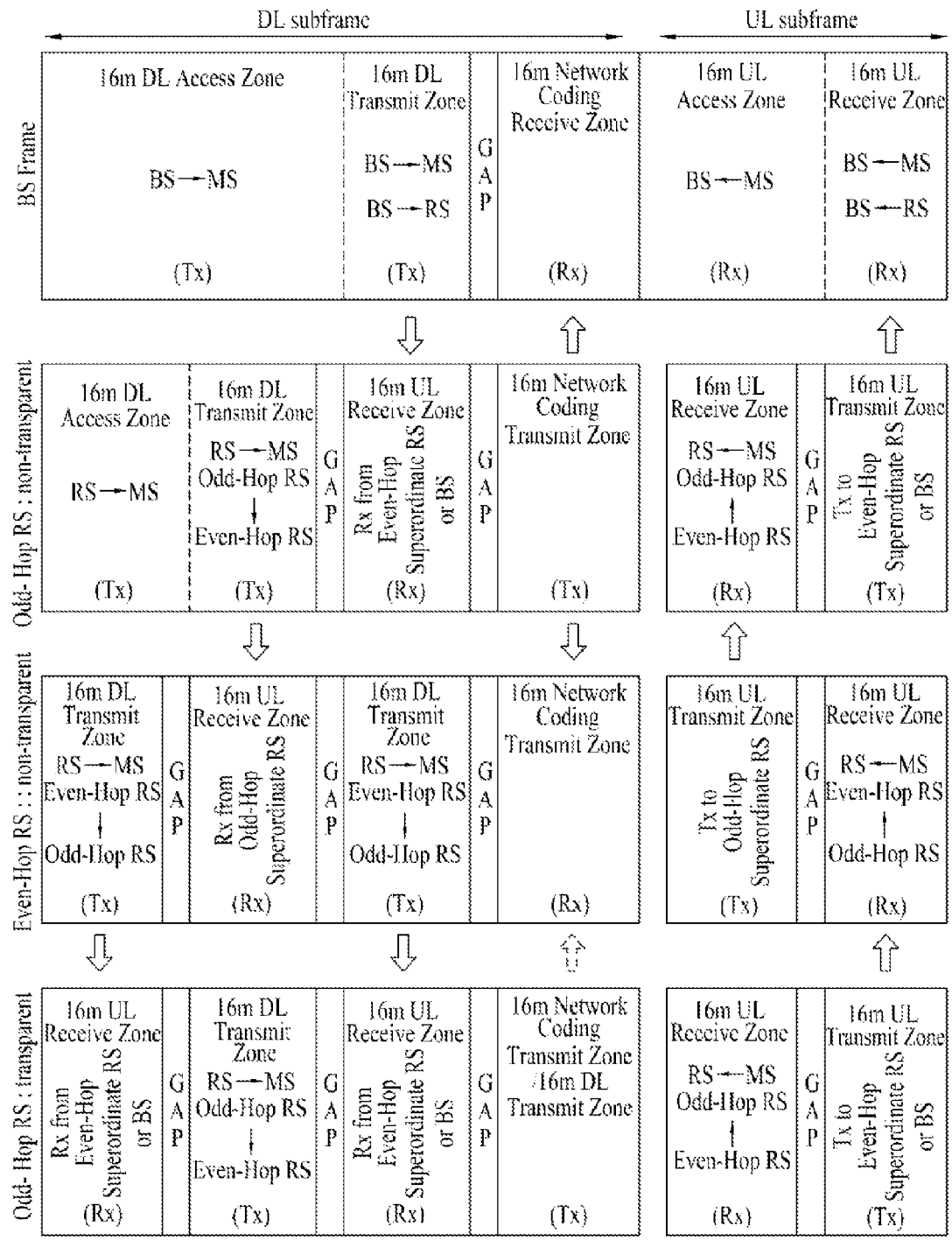
FIGS. 17 and 18 illustrate an example of frame structure that transparent RS and non-transparent RS coexist, respectively.
Figure 18:
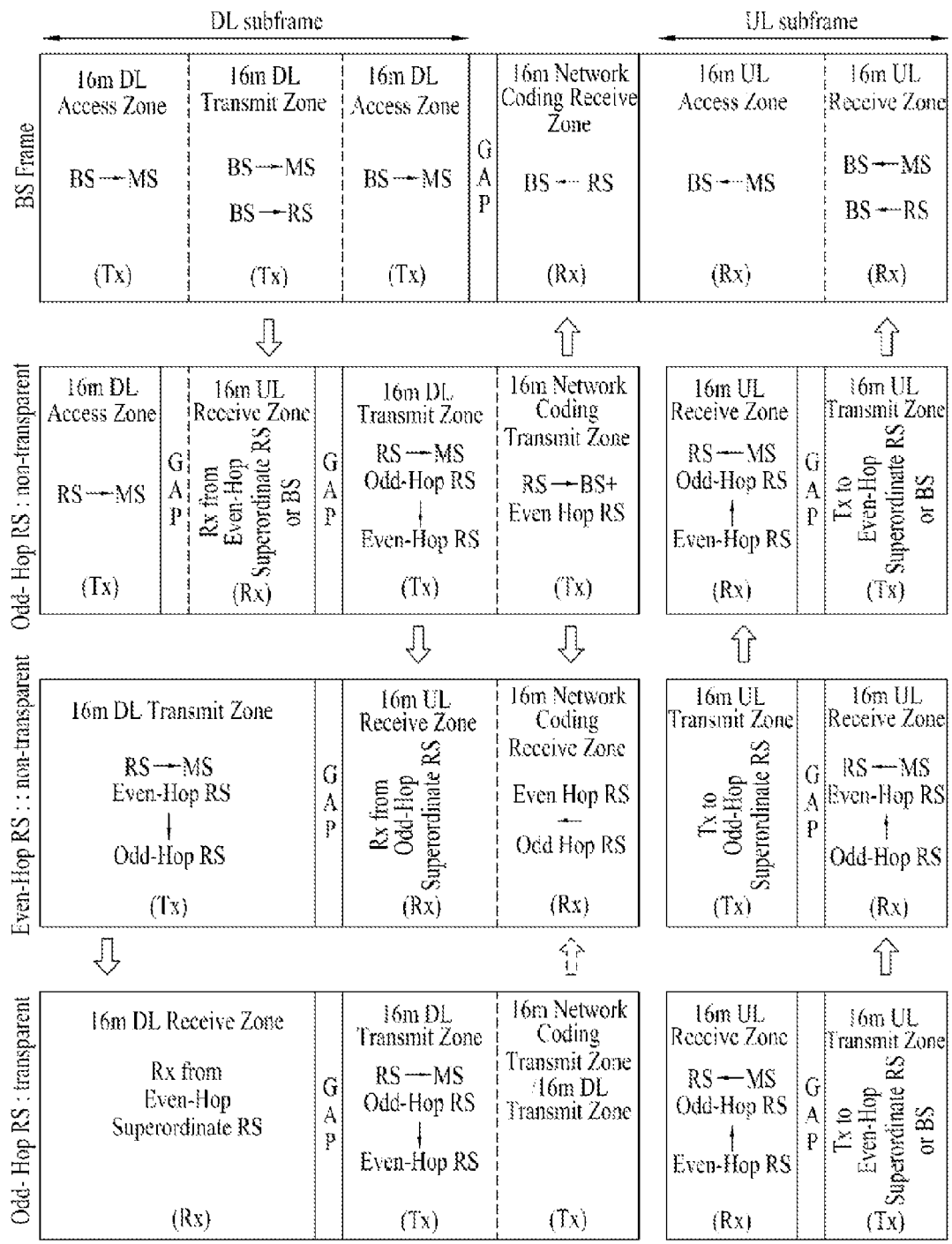

FIG. 16 illustrates coexistence structure of transparent RS and non-transparent RS, FIGS. 17 and 18 illustrate an example of frame structure that transparent RS and non-transparent RS coexist, respectively.

Referring to FIGS. 17 and 18, a BS is connected to a non-transparent RS (odd hop), the odd-hop non-transparent RS is connected to a subordinate non-transparent RS (even hop), the even-hop non-transparent RS is connected to a subordinate transparent RS (odd-hop).

In the FIG. 17, downlink subframes of the odd hop (3 hop) transparent RS may be allocated 16m DL receive zone, 16m DL transmit zone, 16m DL receive zone, and 16m network coding transmit zone (or 16m DL transmit zone) in order, uplink subframes of odd hop (3 hop) transparent RS may be allocated 16m UL receive zone and 16m UL transmit zone in order. That is, a plurality of the 16m DL receive zones may be allocated at the different timing point in the downlink subframes.

Downlink subframes of the superordinate even hop (2 hop) non-transparent RS of the odd hop (3 hop) transparent RS may be allocated 16m DL transmit zone, 16m DL receive zone, 16m DL transmit zone, and 16m network coding transmit zone in order, uplink subframes of the superordinate even hop (2 hop) non-transparent RS may be allocated 16m UL transmit zone and 16m UL receive zone in order. In other words, a plurality of the 16m DL transmit zone may be allocated at the different timing point in the downlink subframes. Moreover, downlink subframes of the superordinate odd hop (1 hop) non-transparent RS of the even hop (2 hop) non-transparent RS may be allocated 16m DL access zone, 16m DL transmit zone, 16m DL receive zone, and 16m network coding transmit zone in order, uplink subframes of the superordinate odd hop (1 hop) non-transparent RS may be allocated 16m UL receive zone and 16m UL transmit zone in order.

Downlink subframes of the BS may be allocated 16m DL access zone, 16m DL transmit zone, and 16m network coding receive zone in order, uplink subframes of the BS may be allocated 16m UL access zone and 16m UL receive zone in order.

The MS can receive a preamble (A-preamble), MAP (A-MAP) information, control signals, and the like from the 16m DL transmit zone of the non-transparent RS.

Referring to FIG. 18, comparing to FIG. 13, it is different that the downlink subframes of the BS may be allocated 16m UL access zone, 16m DL transmit zone, and 16m UL access zone in order, a plurality of the downlink zones is allocated at the different timing point. Furthermore, according as downlink frame of an odd-hop (3-hop) transparent RS may be allocated 16m DL receive zone, 16m DL transmit zone, and 16m network coding transmit zone (or 16m DL transmit zone) in order, it is different that the DL receive zone may be allocated at one timing point. Similarly, according as Downlink subframes of an even-hop (2-hop) non-transparent RS may be allocated 16m DL transmit zone, 16m DL receive zone, and 16m network coding receive zone in order, it is different that the DL transmit zone may be allocated at one timing point. Meanwhile, according as downlink subframes of an odd-hop (1-hop) non-transparent RS may be allocated 16m DL access zone and 16m DL receive zone, 16m DL transmit zone, and 16m network coding transmit zone in order, it is different that transmit zone timing point subsequent to receive zone is allocated.

Figure 19:
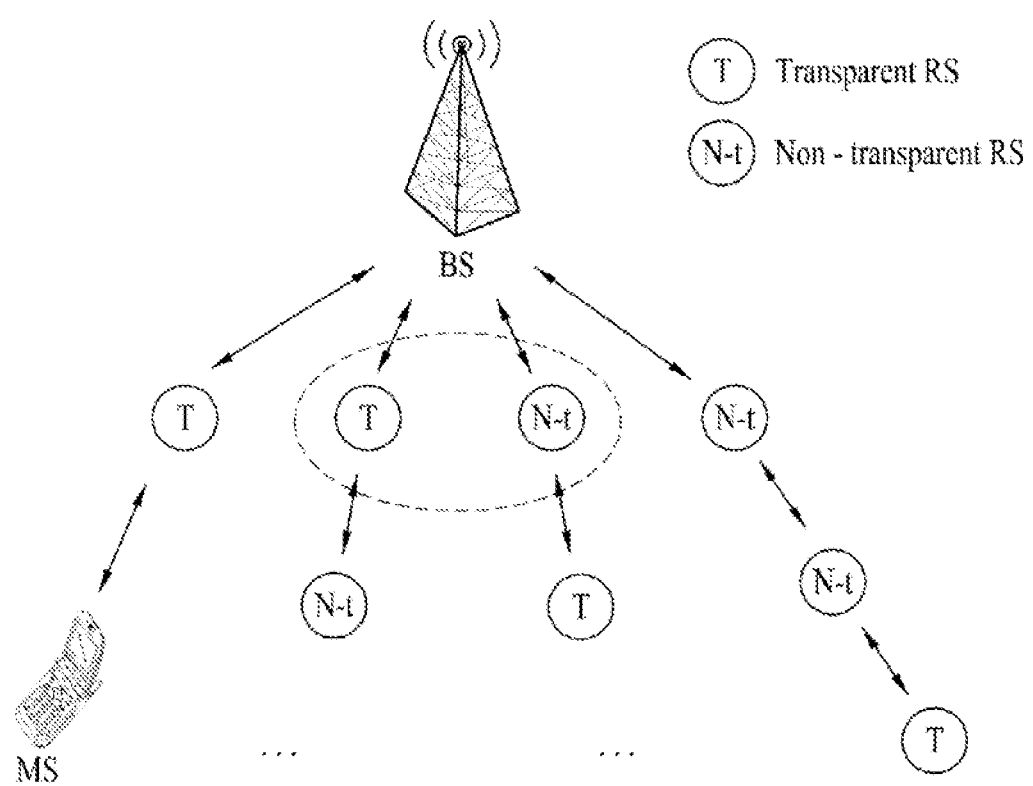
FIG. 19 illustrates coexistence structure of transparent RS and non-transparent RS.
Figure 20:
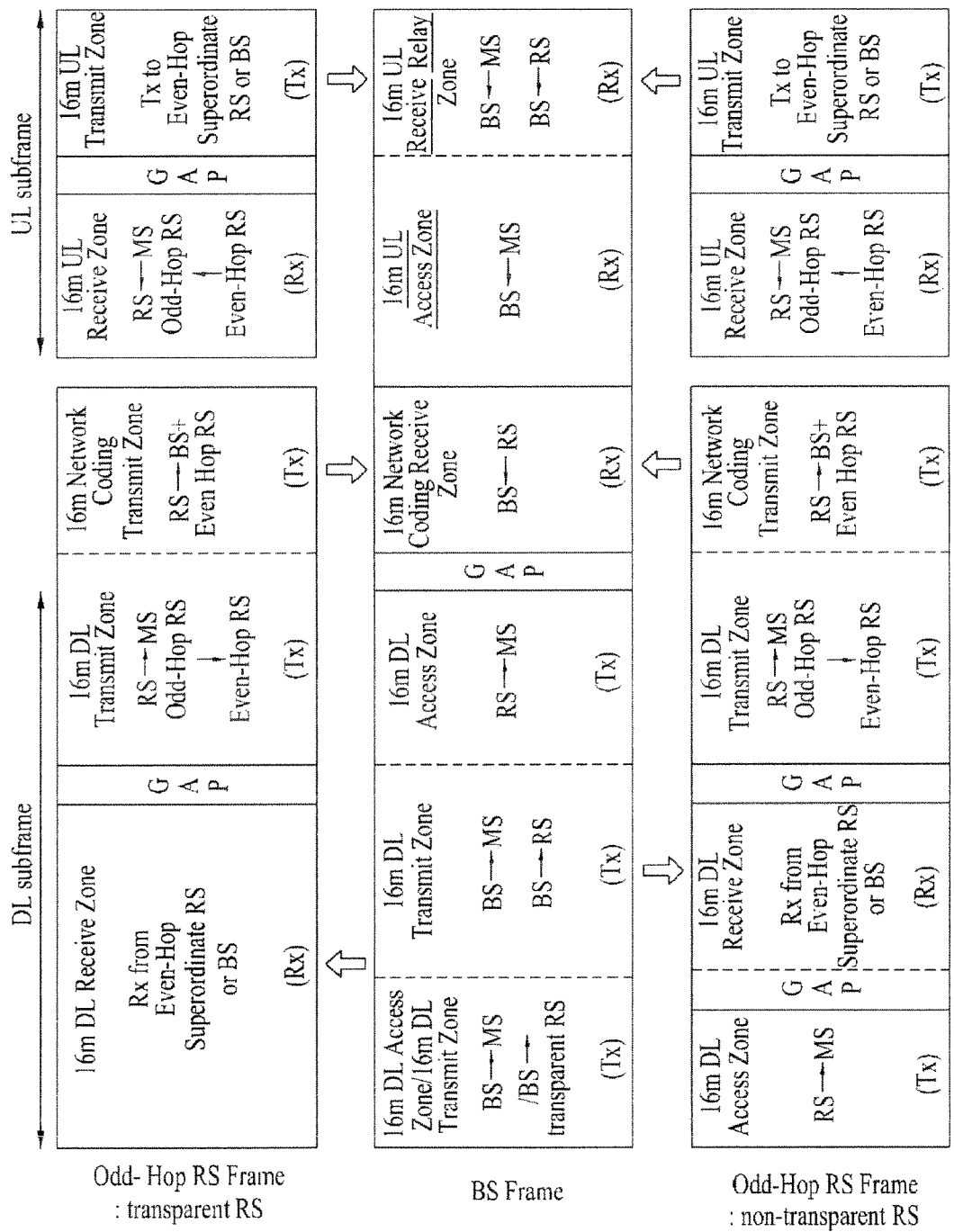
FIG. 20 illustrates an example of frame structure that transparent RS and non-transparent RS coexist.

FIG. 19 illustrates coexistence structure of transparent RS and non-transparent RS, FIG. 20 illustrates an example of frame structure that transparent RS and non-transparent RS coexist.

Referring to FIG. 20, the frame structure shown in FIG. 20 can support simultaneously transparent RS and non-transparent RS located at same hop (odd-hop, e.g., 1-hop). Downlink subframes of an odd-hop transparent RS may be allocated 16m DL receive zone, 16m DL transmit zone, and 16m network coding zone in order, uplink subframes of an odd-hop transparent RS may be allocated 16m UL receive zone and 16m UL transmit zone in order. Downlink subframes of the BS may be allocated 16m DL access zone (or 16m DL transmit zone), 16m DL transmit zone, 16m DL access zone, and 16m network coding receive zone in order, uplink subframes of the BS may be allocated 16m UL access zone, 16m UL receive zone in order.

Furthermore, downlink subframes of the odd-hop transparent RS may be allocated 16m DL access zone, 16m DL receive zone, 16m DL transmit zone, and 16m network coding transmit zone in order, uplink subframes of the odd-hop transparent RS may be allocated 16m UL receive zone and 16m UL transmit zone in order. The BS can simultaneously transmit data to the transparent RS and the non-transparent RS located at same hop. In contrast, the BS can simultaneously receive data through the 16m network coding receive zone from the transparent RS and the non-transparent RS located at same hop. In order to support simultaneously the transparent RS and the non-transparent RS by one BS, it is preferably that frame structure is configured as shown in FIG. 15. If the frame structure is structure of type as shown in FIG. 15, coexistence structure may also be the structure of type as shown in FIG. 15, additional signal and transition gap may be reduced.

Figure 21:
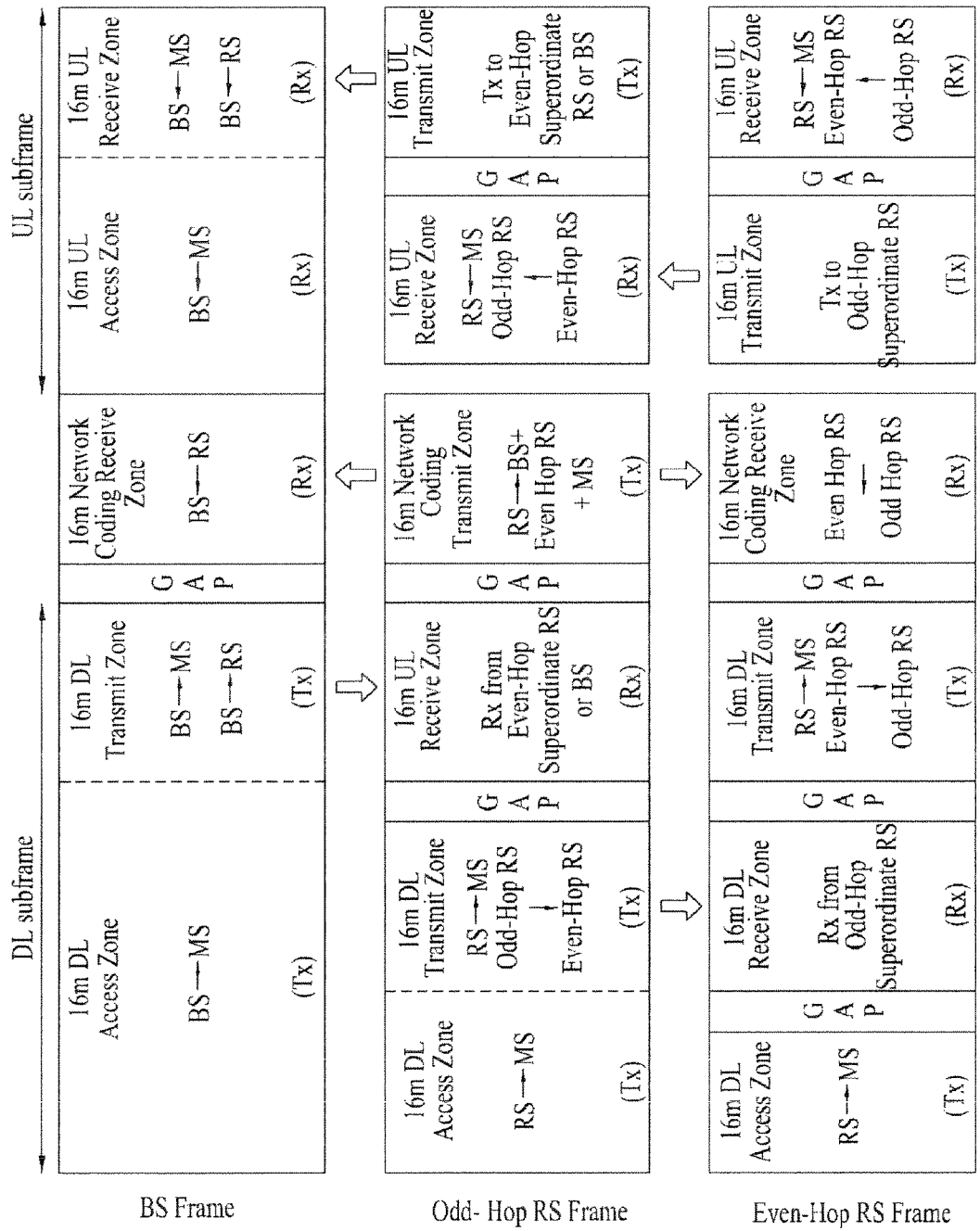
FIG. 21 and FIG. 22 illustrate an example of frame structure of non-transparent RS, respectively.
Figure 22:
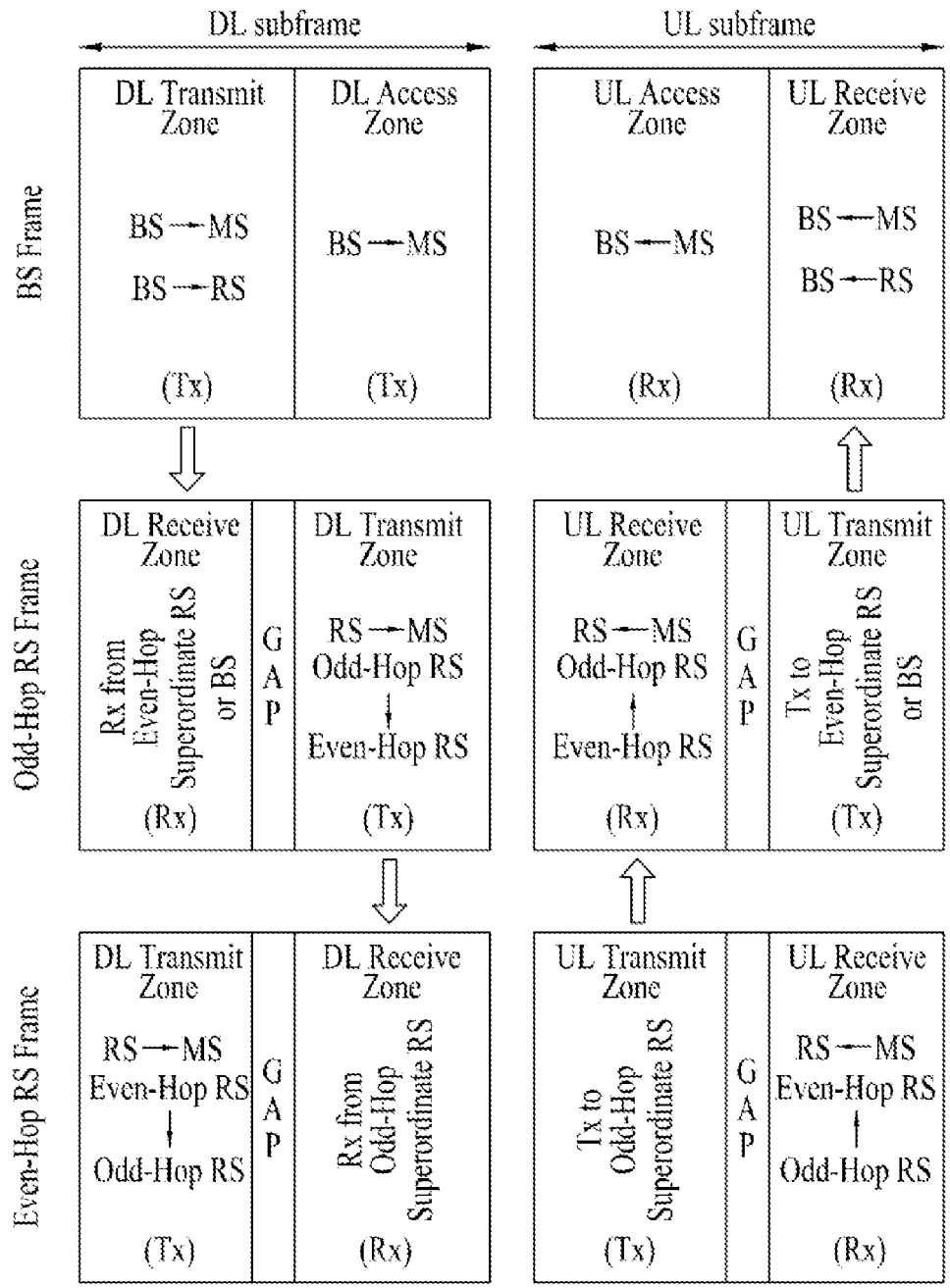

FIG. 21 and FIG. 22 illustrate an example of frame structure of non-transparent RS, respectively.

Referring to FIG. 21, downlink subframes of the BS may be allocated 16m DL access zone, 16m DL transmit zone, and 16m network coding receive zone in order, uplink subframes of the BS may be allocated 16m UL access zone and 16m UL receive zone in order.

Downlink subframes of an odd-hop transparent RS may be allocated 16m DL access zone, 16m DL transmit zone, and 16m network coding transmit zone in order, uplink subframes of the odd-hop transparent RS may be allocated 16m UL receive zone and 16m UL transmit zone in order.

Downlink subframes of an even-hop transparent RS may be allocated 16m DL access zone, 16m DL receive zone, 16m DL transmit zone, and 16m network coding receive zone in order.

Referring to FIG. 22, downlink subframes of a BS and a non-transparent RS may be configured to have different order from the allocation order of downlink subframes of a BS and a non-transparent RS shown in FIG. 1.

Figure 23:
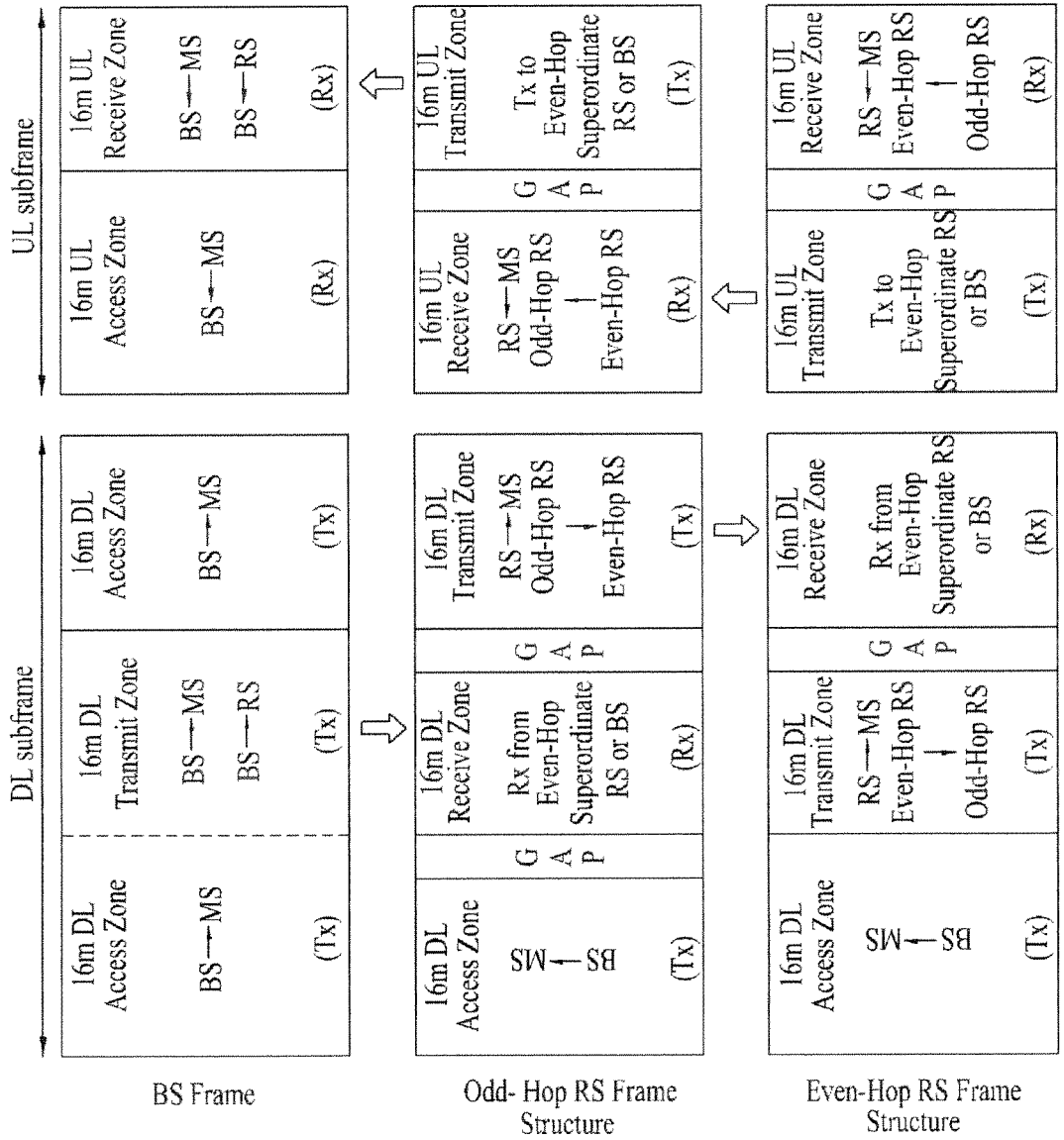
FIG. 23 illustrates an example of frame structure of non-transparent RS.

FIG. 23 illustrates an example of frame structure of non-transparent RS.

Referring to FIG. 23, common zone may be present in order to transmit a synchronization channel (SCH), broadcast channel (BCH), multicast and broadcast (MBS), and the like in non-transparent relay frame structure which one BS can simultaneously support transparent mode and non-transparent mode.

The common zone may be expressed as 16m DL access zone in downlink subframes of a BS and a RS, RS of each hop can transmit the SCH, the BCH, MBS, and the like to subordinate MS. Other zone except for the common zone is equal to frame structure shown in FIG. 17.

As described above, 16m DL relay zone may be called as 16m DL transmit zone. That is, the 16m DL relay zone and 16m DL transmit zone is allocated at same zone. Moreover, 16m UL relay zone may be called as 16m UL receive zone. Above described the name of zone is not limited to terms used by the present invention. Specific zone which perform the same functions and is located at the same zone may be called as another name of zone. In other words, terms (e.g. the name of zone) used herein may be used interchangeably with other terms having the same meanings.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting data at a relay station (RS) in a wireless communication system using a Time Division Duplex (TDD) frame structure, the TDD frame structure comprising a plurality of TDD frames, each of the plurality of TDD frames comprising a downlink (DL) period and an uplink (UL) period, the method comprising:

receiving, by the RS, a subscriber station basic capability response (SBC-RSP) message including mode information of the RS from a base station (BS) during an initial access procedure, the mode information of the RS indicating that a mode of the RS is a transparent mode;

receiving, by the RS, mode change indication information from the BS, the mode change indication information indicates a changed mode and a change timing point, wherein the changed mode is a non-transparent mode and the change timing point is represented as a frame number of the non-transparent mode;

receiving, by the RS, information related to a starting point of each zone for a RS TDD frame structure of the non-transparent mode;

transceiving, by the RS, signals during a RS TDD frame corresponding to the frame number of the non-transparent mode according to the RS TDD frame structure of the non transparent mode;

based on the information related to the starting point of each zone for the RS TDD frame structure of the non-transparent mode and the frame number of the non-transparent mode, transmitting, by the RS, data to a mobile station (MS) during a first DL zone of a plurality of DL zones of the DL period in the RS TDD frame, wherein the first DL zone is located at a beginning of the DL period;

transmitting, by the RS, data to a subordinate RS during a second DL zone of the plurality of DL zones of the DL period in the RS TDD frame;

receiving, by the RS, data from the BS during a third DL zone of the plurality of DL zones of the DL period in the RS TDD frame; and transmitting, by the RS, data to the MS and BS during a bi-directional zone in the RS TDD frame, wherein, in each of the plurality of TDD frames, the first DL zone is immediately followed by the second DL zone, a first DL gap zone of the DL period is located between the second DL zone and the third DL zone such that the second DL zone is immediately followed by the first DL gap zone and the first DL gap zone is immediately followed by the third DL zone, a second DL gap zone of the DL period is located between the third DL zone and the bi-directional zone such that the third DL zone is immediately followed by the second DL gap zone and the second DL gap zone is immediately followed by the bi-directional zone.

2. The method of claim 1, wherein the first DL zone is a DL access zone.

3. The method according to claim 1, wherein the second DL zone is a DL transmit zone.

4. The method of claim 1, wherein the third DL zone is a DL receive zone.

5. The method of claim 1, wherein;
the RS is an odd-hop RS; and
the subordinate RS is an even-hop RS.

6. A relay station (RS) configured to transmit data in a wireless communication system using a Time Division Duplex (TDD) frame structure, the TDD frame structure comprising a plurality of TDD frames, each of the plurality of TDD frames comprising a downlink (DL) period and an uplink (UL) period, the relay station comprising:

a radio frequency (RF) device configured to transmit and receive; and a processor operatively connected to the RF unit and configured to:

receive a subscriber station basic capability response (SBC-RSP) message including mode information of the RS from a base station (BS) during an initial access procedure, the mode information of the RS indicating that a mode of the RS is a transparent mode;

receive mode change indication information from the BS, the mode change indication information indicates a changed mode and a change timing point, wherein the changed mode is a non-transparent mode and the change timing point is represented as a frame number of the non-transparent mode;

receive information related to a starting point of each zone for a RS TDD frame structure of the non-transparent mode;

transceiver signals during a RS TDD frame corresponding to the frame number of the non-transparent mode according to the RS TDD frame structure of the non-transparent mode;

based on the information related to the starting point of each zone for the RS TDD frame structure of the non-transparent mode and the frame number of the non-transparent mode, transmit data to a mobile station (MS) during a first DL zone of a plurality of DL zones of the DL period in the RS TDD frame, wherein the first DL zone is located at a beginning of the DL period;

transmit data to a subordinate RS or the MS during a second DL zone of the plurality of DL zones of the DL period in the RS TDD frame;

receive data from the BS during a third DL zone of the plurality of DL zones of the DL period in the RS TDD frame; and transmit data to the MS and BS during a bi-directional zone in the RS TDD frame, wherein, in each of the plurality of TDD frames, the first DL zone is immediately followed by the second DL zone, a first DL gap zone of the DL period is located between the second DL zone and the third DL zone such that the second DL zone is immediately followed by the first DL gap zone and the first DL gap zone is immediately followed by the third DL zone, a second DL gap zone of the DL period is located between the third DL zone and the bi-directional zone such that the third DL zone is immediately followed by the second DL gap zone and the second DL gap zone is immediately followed by the bi-directional zone.

* * * * *